(12) United States Patent
Kochidomari et al.

(10) Patent No.: US 10,744,867 B2
(45) Date of Patent: Aug. 18, 2020

(54) HYBRID UTILITY VEHICLE

(71) Applicant: KANZAKI KOKYUKOKI MFG. CO., LTD., Amagasaki-shi, Hyogo (JP)

(72) Inventors: Yoshitaka Kochidomari, Amagasaki (JP); Takashi Nishizawa, Amagasaki (JP)

(73) Assignee: Kanzaki Kokyukoki Mfg. Co., Ltd., Amagasaki-shi (JP)

(*) Notice: Subject to any disclaimer, the term of this patent is extended or adjusted under 35 U.S.C. 154(b) by 0 days.

(21) Appl. No.: 16/100,669

(22) Filed: Aug. 10, 2018

(65) Prior Publication Data

US 2018/0361843 A1    Dec. 20, 2018

Related U.S. Application Data

(63) Continuation of application No. 15/660,650, filed on Jul. 26, 2017, now Pat. No. 10,065,493, which is a
(Continued)

(51) Int. Cl.
*B60K 1/00*    (2006.01)
*B60K 6/40*    (2007.10)
(Continued)

(52) U.S. Cl.
CPC ............ *B60K 6/40* (2013.01); *B60K 7/0007* (2013.01); *B60K 17/043* (2013.01); *B60K 6/48* (2013.01); *B60K 6/485* (2013.01); *B60K 6/52* (2013.01); *B60K 6/543* (2013.01); *B60K 17/046* (2013.01); *B60K 17/22* (2013.01); *B60K 17/344* (2013.01); *B60K 17/356* (2013.01); *B60K 2007/0038* (2013.01); *B60K 2007/0092* (2013.01); *F16H 37/021* (2013.01); *F16H 37/065* (2013.01); *Y02T 10/6226* (2013.01);
(Continued)

(58) Field of Classification Search
CPC . B60K 6/40; B60K 6/48; B60K 6/485; B60K 6/52; B60K 6/543; B60K 6/405; B60K 6/38; B60K 6/387; B60K 6/42; B60K 6/00; B60K 6/20; B60K 6/28; B60K 6/36; B60K 6/26; B60K 7/00; B60K 7/0007; B60K 2007/0038; B60K 2007/0092; B60K 17/00; B60K 17/043; B60K 17/046; B60K 17/22; B60K 17/344; B60K 17/356; F16H 37/00; F16H 37/02; F16H 37/021; F16H 37/06; F16H 37/065
See application file for complete search history.

(56) References Cited

U.S. PATENT DOCUMENTS 4,235,300 A      11/1980   Capjon
6,253,865 B1 *   7/2001    Suzuki ............... B60L 50/16
                                              180/65.25
(Continued)

*Primary Examiner* — James M Dolak
(74) *Attorney, Agent, or Firm* — Sterne, Kessler, Goldstein & Fox P.L.L.C.

(57) ABSTRACT

A vehicle comprises a transaxle, a battery and a load carrying bed. The transaxle includes a casing incorporating a drive train and supporting an axle and includes an electric motor mounted on the casing to drive the axle via the drive train. The battery is provided for supplying electric power to the electric motor. The transaxle and the battery are disposed below the load carrying bed so as to overlap the load carrying bed when viewed in plan.

4 Claims, 19 Drawing Sheets

Related U.S. Application Data continuation of application No. 14/668,440, filed on Mar. 25, 2015, now Pat. No. 9,744,843, which is a continuation of application No. 13/623,663, filed on Sep. 20, 2012, now Pat. No. 9,242,544.

(60) Provisional application No. 61/538,641, filed on Sep. 23, 2011.

(51) Int. Cl.
| | | |
|---|---|---|
| *B60K 7/00* | (2006.01) | |
| *B60K 17/04* | (2006.01) | |
| *B60K 6/485* | (2007.10) | |
| *B60K 6/52* | (2007.10) | |
| *B60K 6/543* | (2007.10) | |
| *B60K 17/344* | (2006.01) | |
| *F16H 37/02* | (2006.01) | |
| *F16H 37/06* | (2006.01) | |
| *B60K 17/22* | (2006.01) | |
| *B60K 17/356* | (2006.01) | |
| *B60K 6/48* | (2007.10) | |

(52) U.S. Cl.
CPC ........ *Y02T 10/6265* (2013.01); *Y10S 903/951* (2013.01); *Y10T 477/23* (2015.01)

(56) References Cited

U.S. PATENT DOCUMENTS

| | | | |
|---|---|---|---|
| 6,378,638 B1 | 4/2002 | Mizon et al. | |
| 6,856,035 B2 | 2/2005 | Brandon et al. | |
| 6,877,573 B2 | 4/2005 | Hasegawa | |
| 6,932,179 B2 | 8/2005 | Sakikawa et al. | |
| 7,377,351 B2 * | 5/2008 | Smith | B60K 17/354 |
| | | | 180/233 |
| 7,497,285 B1 * | 3/2009 | Radev | B60W 10/08 |
| | | | 180/65.225 |
| 7,665,564 B2 * | 2/2010 | Smith | B60K 17/354 |
| | | | 180/233 |
| 7,867,132 B2 * | 1/2011 | Ishii | B60K 17/344 |
| | | | 475/293 |
| 7,921,949 B2 * | 4/2011 | Cantemir | B60L 50/16 |
| | | | 180/65.6 |
| 7,926,387 B2 * | 4/2011 | Horiuchi | B60W 10/06 |
| | | | 180/312 |
| 7,946,953 B2 | 5/2011 | Koga et al. | |
| 7,980,339 B2 | 7/2011 | Ishii et al. | |
| 8,011,461 B2 * | 9/2011 | Rodriguez | B60K 6/40 |
| | | | 180/65.23 |
| 8,182,393 B2 | 5/2012 | Gillingham et al. | |
| 8,337,346 B2 | 12/2012 | Kochidomari et al. | |
| 8,403,094 B2 | 3/2013 | Kochidomari et al. | |
| 8,469,133 B2 | 6/2013 | Kaiser et al. | |
| 8,469,137 B2 * | 6/2013 | Fujii | B60K 17/06 |
| | | | 180/312 |
| 8,579,055 B2 | 11/2013 | Sasahara et al. | |
| 8,662,239 B2 | 3/2014 | Takagi | |
| 8,701,806 B2 | 4/2014 | Ishii et al. | |
| 8,708,074 B1 * | 4/2014 | McCoy | B60K 6/52 |
| | | | 180/65.51 |
| 9,272,619 B2 | 3/2016 | Quehenberger et al. | |
| 9,475,384 B2 | 10/2016 | Matsuura et al. | |
| 9,511,761 B2 * | 12/2016 | Yagyu | B60W 20/30 |
| 9,669,711 B2 | 6/2017 | Nishimoto | |
| 9,731,598 B2 | 8/2017 | Reed et al. | |
| 9,744,843 B2 | 8/2017 | Kochidomari et al. | |
| 9,765,826 B2 | 9/2017 | Nishimoto | |
| 9,827,971 B2 * | 11/2017 | Suzuki | B60W 10/26 |
| 10,232,699 B2 * | 3/2019 | Oyama | B60R 21/13 |
| 10,538,157 B2 * | 1/2020 | Oyama | B60K 6/543 |
| 2005/0230171 A1 | 10/2005 | Hasegwa et al. | |
| 2010/0120565 A1 | 5/2010 | Kochidomari et al. | |
| 2010/0263958 A1 | 10/2010 | Kochidomari et al. | |
| 2011/0276241 A1 * | 11/2011 | Nakao | B60L 50/16 |
| | | | 701/69 |
| 2013/0168176 A1 | 7/2013 | Takagi | |

\* cited by examiner

HYBRID UTILITY VEHICLE

CROSS-REFERENCE TO RELATED APPLICATIONS

This application is a continuation of U.S. application Ser. No. 15/660,650, filed on Jul. 26, 2017, which is a continuation of U.S. application Ser. No. 14/668,440, filed Mar. 25, 2015, which is a continuation of U.S. application Ser. No. 13/623,663, filed Sep. 20, 2012, which claims the benefit of U.S. Application No. 61/538,641, filed Sep. 23, 2011, which benefit is also claimed by this application. These applications are hereby incorporated by reference in their entirety.

BACKGROUND OF THE INVENTION

Field of the Invention

The present invention relates to a vehicle, such as a utility vehicle, equipped with an electric transaxle integrated with an axle and an electric motor for driving the axle. Also, the present invention relates to a transmission assembly adapted to be driven by an engine and provided with an electric motor for assisting the engine. Especially, the transmission assembly includes a continuously variable belt transmission (CVT).

Background Art

As disclosed by U.S. Pat. No. 7,926,387 B, a conventional utility vehicle is equipped with a rear transaxle under a load carrying bed. The rear transaxle includes a housing incorporating a gear train and a differential. An engine and a hydrostatic stepless transmission (HST) are directly mounted on the housing. The rear transaxle supports rear wheel axles. A front transaxle supporting front wheel axles is separated from the rear transaxle and is disposed at a front portion of the vehicle forward of the load carrying bed. A housing of the front transaxle incorporates a differential, and a PTO shaft projects from the housing of the rear transaxle so as to be drivingly connected to the differential of the front transaxle via a propeller shaft. Power of the engine is transmitted to the rear wheel axles and the front wheel axles via the HST and the gear train.

As disclosed by U.S. Pat. No. 7,946,953 B and US 2010/0263958 A, another conventional engine utility vehicle is equipped with a mid-shipped engine, a rear transaxle casing supporting right and left rear wheels, a front transaxle casing supporting right and left front wheels, and a transmission for distributing power of the engine between the front and rear transaxle casings. Each of the front and rear transaxle casings incorporates a differential unit differentially connecting the right and left front or rear wheels to each other. The transmission is a combination of a hydrostatic stepless transmission (HST) and a gear transmission, or a combination of a belt transmission serving as a continuously variable transmission (CVT) and a gear transmission, for example.

Some types of sports utility vehicle are mainly used for hunting purposes. Silence is a matter of great importance for hunting vehicles. Therefore, many utility vehicles used for hunting are electric vehicles equipped with electric motors. However, hunting vehicles are sometimes desired to have great power, such as engine power, for high-speed traveling on roads, for high-torque traveling on rough fields, or for other purposes. Further, recently, people dwelling in residential districts have greatly demanded utility vehicles because the utility vehicles are convenient for various daily living tasks, e.g., for taking children to and from school or kindergarten bus stops. The residents desire silence, compactness and economy of the utility vehicles. An electric motor is an effective means for achieving the silence. However, the residents also sometimes desire the utility vehicles to have great power, such as engine power, for high-speed traveling on roads or other purposes.

To satisfy the above-mentioned desires, a utility vehicle is expected to have an engine and an electric motor and to be configured so that either/both electric power or/and engine power can be optionally selected as power for driving the utility vehicle, while ensuring compactness in structure and economy in structure and in power consumption.

Further, as disclosed by US 2010/0120565 A, there is a well-known conventional vehicle equipped with a transmission assembly that includes a belt transmission driven by an engine, and a gear transmission driven by the belt transmission. This belt transmission is a continuously variable transmission (CVT) that automatically changes its speed ratio in correspondence to an output speed of the engine and an actual traveling speed of the vehicle. The defect of the CVT is a delay of reduction of output speed. In other words, a vehicle equipped with a multi-speed gear transmission can greatly reduce the traveling speed by a speed-down shift operation of the gear transmission. Such an efficient reduction of traveling speed is called "engine brake", however, the CVT cannot serve as the engine brake in at least a part of its overall speed shift range. As a result, the CVT needs to apply a mechanical brake to efficiently reduce a traveling speed of a vehicle in such a case where the vehicle descends a slope.

BRIEF SUMMARY OF THE INVENTION

A first object of the invention is to provide a vehicle that is adaptable as a compact and economical utility vehicle which can travel silently by use of electric power. Preferably, the vehicle is configured so that either electric power or engine power can be optionally selected for driving the vehicle.

To achieve the first object, a vehicle according to the invention comprises a transaxle, a battery, a load carrying bed and a seat. The transaxle includes a casing incorporating a drive train and supporting an axle and includes an electric motor mounted on the casing to drive the axle via the drive train. The battery is provided for supplying electric power to the electric motor. The transaxle is disposed below the load carrying bed so as to overlap the load carrying bed when viewed in plan. The battery is disposed below the load carrying bed or the seat so as to overlap the load carrying bed or the seat when viewed in plan.

Therefore, the vehicle can travel silently by the electric power of the electric motor. The vehicle is advantageous in expanding an available space, such as an operator's space involving the seat forward (or rearward) of the load carrying bed, while ensuring compactness of the entire vehicle because a dead space below the load carrying bed is utilized for arranging the transaxle including the electric motor and because the dead space below the load carrying bed or a dead space below the seat is utilized for arranging the battery. Further, the battery can be exchanged for a new battery easily by moving the load carrying bed or the seat for opening the space below the load carrying bed or the seat, thereby improving maintenanceability of the battery.

Preferably, in a first aspect of the vehicle, the transaxle is configured so that the electric motor and a portion of the casing supporting the axle are extended from another portion of the casing incorporating the drive train so as to vertically offset from each other and so as to overlap each other when viewed in plan.

Therefore, the electric motor and the portion of the casing supporting the axle can be extended horizontally from the portion of the casing incorporating the drive train so as to vertically minimize the transaxle, while the vertical offset of the electric motor and the portion of the casing supporting the axle, which overlap each other when viewed in plan, minimizes the transaxle horizontally (laterally or longitudinally), thereby further enabling the transaxle to be compactly disposed below the load carrying bed so as to further ensure the compactness of the entire vehicle and so as to further expand an available space in the vehicle such as the operator's space. Further, the electric motor can be easily attached or detached to and from the casing of the transaxle (preferably, the portion of the casing incorporating the drive train) at a position where there is no fear of interference with the portion of the casing supporting the axle, thereby improving the maintenanceability of the electric motor, and whereby the vehicle can be designed to have the electric motor attached optionally. For example, the electric motor is extended rearward from an upper portion of the portion of the casing incorporating the drive train and above the portion of the casing supporting the axle. In this case, the vehicle may be configured so that a vehicle frame under the load carrying bed has a rear end portion which can open and shut for easily attaching or detaching the electric motor to and from the casing.

Preferably, in a second aspect of the vehicle, the transaxle is defined as a first transaxle, and the vehicle further comprises a second transaxle supporting another axle.

Preferably, in the second aspect, an end of the battery toward the second transaxle is closer to the first transaxle than the second transaxle.

Therefore, a distance of the second transaxle from the battery is longer than another distance of the first transaxle from the battery so that this longer distance of the second transaxle from the battery can be used to ensure the sufficiently large operator's space.

Preferably, in the second aspect, the second transaxle is drivingly connected to the first transaxle so that power of the electric motor is transmitted to the second transaxle.

Therefore, the electric motor of the first transaxle also serves as a power source for the second transaxle, thereby reducing the number of members serving as power sources so as to reduce costs and so as to expand a free space in the vehicle or so as to minimize the vehicle.

Preferably, in the second aspect, the second transaxle includes a second electric motor for the axle of the second transaxle, and the battery also supplies electric power to the second electric motor.

Therefore, the vehicle needs no element for drivingly connecting the second transaxle to the first transaxle or a power source that is distant from the second transaxle, thereby expanding a free space such as an operator's space or minimizing the vehicle.

Further preferably, a pair of transaxles which are identical to each other serve as the first and second transaxles.

Therefore, the transaxles are standardized so as to reduce costs for manufacturing the vehicle.

Further preferably, each of the pair of transaxles serving as the first and second transaxles is configured so that the electric motor and a portion of the casing supporting the axle are extended from another portion incorporating the drive train so as to vertically offset from each other and so as to overlap each other when viewed in plan.

Therefore, in addition to the economical standardization of the transaxles, the second transaxle is also subjected to the above-mentioned advantageous compactness of the first transaxle.

Preferably, in a third aspect of the vehicle, the vehicle further comprises an engine for driving the drive train. The engine is disposed below the load carrying bed or the seat so as to overlap the load carrying bed or the seat when viewed in plan.

Therefore, the vehicle is adaptable as a hybrid vehicle equipped with the engine and the transaxle including the electric motor. Further, the dead space below the load carrying bed or the seat is utilized for arranging the engine, thereby expanding an available space in the vehicle, such as the operator's space involving the seat forward (or rearward) of the load carrying bed, while ensuring compactness of the entire vehicle.

Preferably, in the third aspect, the vehicle further comprises a transmission casing incorporating a transmission mechanism for transmitting power from the engine to the axle of the transaxle.

Therefore, the vehicle is adaptable as a hybrid vehicle that can drive the axle by the engine and/or the electric motor of the transaxle.

Further preferably, the transmission casing is disposed below the load carrying bed or the seat so as to overlap the load carrying bed or the seat when viewed in plan.

Therefore, the dead space below the load carrying bed or the seat is utilized for arranging the transmission casing, thereby expanding an available space in the vehicle such as the operator's space while ensuring compactness of the entire vehicle.

Preferably, the vehicle further comprises a second transaxle supporting another axle. The transmission mechanism in the transmission casing also transmits power from the engine to the second transaxle.

Therefore, power of the engine is distributed between the axles of the two transaxles via the transmission mechanism in the transmission casing. The electric motor can assist the engine for driving the axle or can drive the axle while the axles receive no power from the engine.

Preferably, in the third aspect, the transaxle is configured so that the electric motor and a portion of the casing supporting the axle are extended from another portion of the casing incorporating the drive train so as to vertically offset from each other and so as to overlap each other when viewed in plan.

Therefore, the compactness of the transaxle due to the vertical offsetting of the electric motor and the portion of the casing supporting the axle overlapping when viewed in plan is further advantageous for the vehicle equipped with the engine (and the transmission casing) in expanding an available space in the vehicle such as the operator's space while ensuring the compactness of the entire vehicle.

To achieve the first object, an alternative vehicle according to the invention comprises right and left electric transaxles, right and left first drive wheels, an engine, right and left second drive wheels, a transmission for transmitting power from the engine to the right and left second drive wheels, a generator, a battery, and a mode selection means. Each of the right and left electric transaxles includes a casing incorporating a drive train and supporting an axle, and includes an electric motor mounted on the casing to drive the axle via the drive train. The right and left first drive wheels are provided on the axles of the respective right and left electric transaxles. The generator generates electric power by driving the engine. The battery reserves the electric power generated by the generator so as to supply the electric power to the electric motors of the right and left electric transaxles. The mode selection means is provided for selecting either a first drive mode where only the right and left first drive wheels are driven by the electric motors of the respective right and left electric transaxles or a second drive mode where only the right and left second drive wheels are driven by the engine via the transmission.

Therefore, an operator who operates the vehicle can operate the mode selection means so as to optionally select either the first drive mode for driving the vehicle by only electric power, thereby obtaining silence, or the second drive mode for driving the vehicle by only engine power, thereby obtaining high torque for efficient traveling of the vehicle. Such an optional selection of drive mode is advantageous in achieving an operator's desired traveling performance of the vehicle as well as or rather than economizing power consumption of the vehicle. Further, the vehicle has neither means for transmitting power of the engine to the first drive wheels nor means for transmitting power of the electric motors to the second drive wheels, thereby being simplified and economized in structure.

A second object of the invention is to provide a transmission assembly including a belt transmission (CVT) driven by an engine and a second transmission driven by the CVT so that the transmission assembly can efficiently reduce its output speed in spite of the gradual speed-shift of the CVT.

To achieve the second object, a transmission assembly includes a belt transmission, a second transmission, a housing and a motor generator. The belt transmission is driven by an engine. The second transmission includes a plurality of shafts including at least an input shaft and an output shaft. The input shaft is driven by the belt transmission, and the output shaft is driven by the input shaft. The housing incorporates the second transmission. The belt transmission is attached to one side of the housing. The motor generator includes a rotor and a stator. The motor generator is mounted on another side of the housing opposite to the belt transmission so as to function as either an electric motor for driving the output shaft or a generator driven by the engine via the belt transmission so that the motor generator serves as a regeneration brake for braking the output shaft when the motor generator functions as the generator. One of the plurality of shafts of the second transmission is extended to serve as a rotor shaft provided thereon with the rotor.

Therefore, a vehicle equipped with an engine and the transmission assembly can save the engine power consumption with the assistance of the motor generator functioning as the electric motor, and can efficiently reduce its traveling speed by the regeneration brake function of the motor generator functioning as the generator in such a case where the vehicle descends a slope. The transmission assembly can be easily and compactly provided with the motor generator by extending the one of the plurality of shafts of the second transmission on the side of the housing opposite to the belt transmission so as to avoid interference with the belt transmission.

These, further and other objects, features and advantages of the invention will appear more fully from the following detailed description with reference to the accompanying drawings.

DETAILED DESCRIPTION OF THE INVENTION

Figure 1:
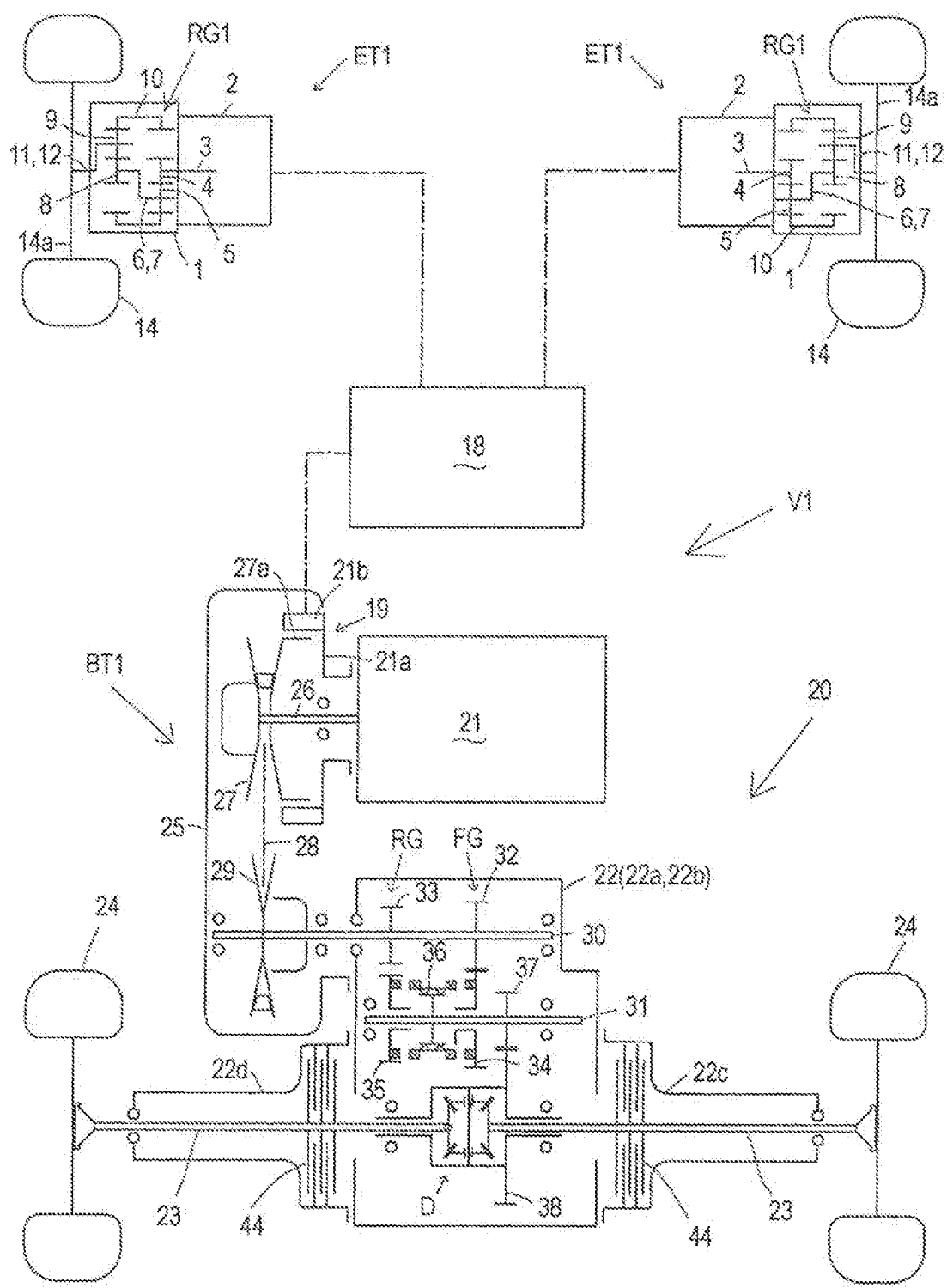
FIG. 1 is a skeleton diagram of a hybrid vehicle V1 equipped with a pair of electric transaxles ET1 for driving front wheels 14 and with an engine-transmission assembly 20 for driving rear wheels 24.
Figure 2:
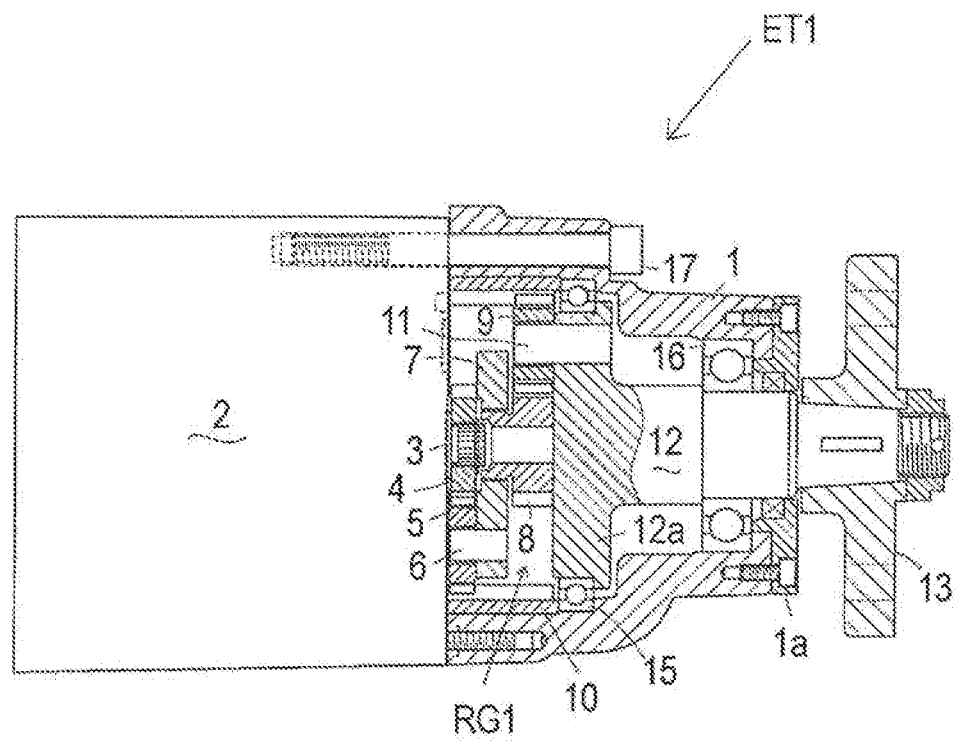
FIG. 2 is a plan view partly in section of electric transaxle ET1 used for vehicle V1.
Figure 3:
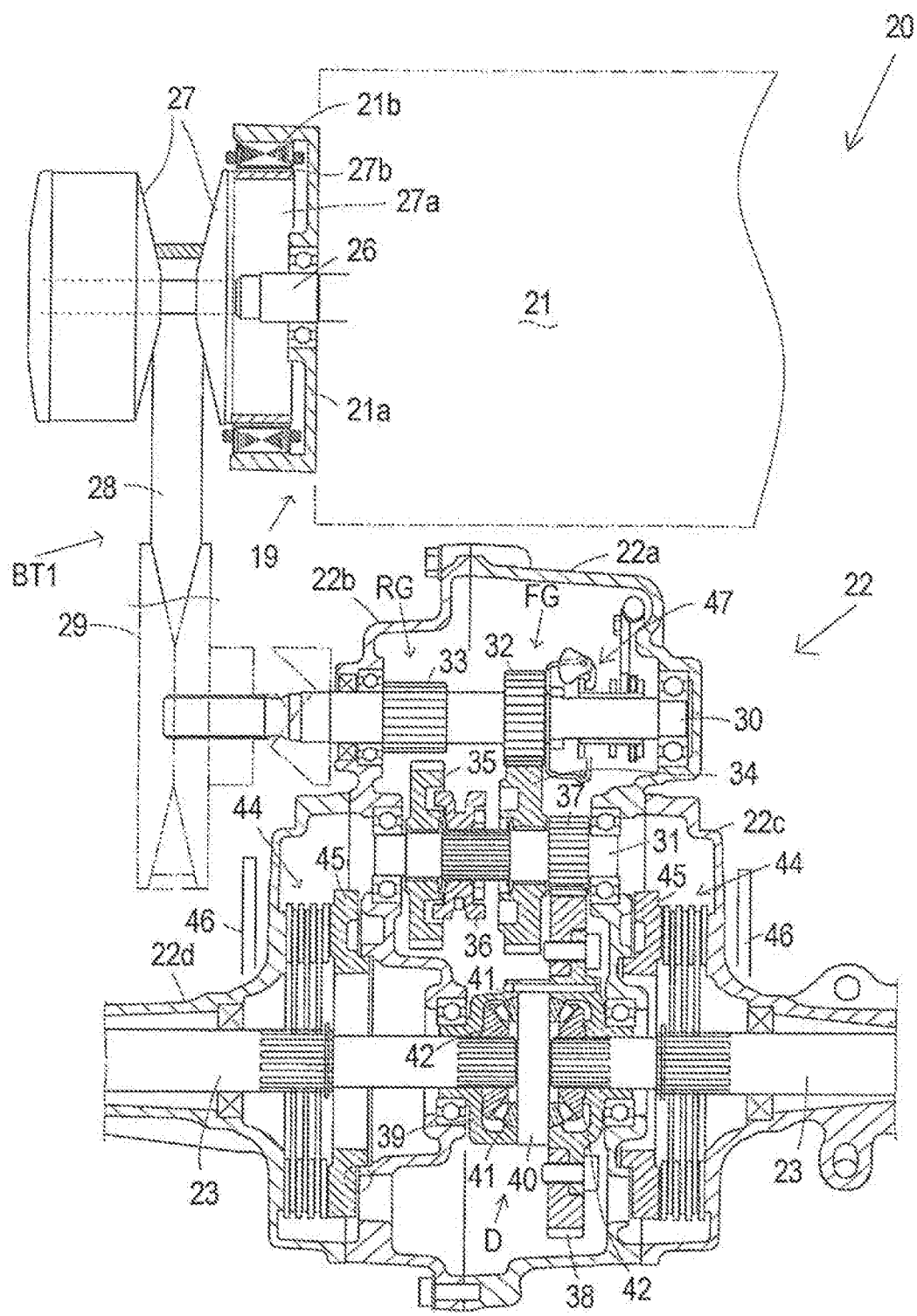
FIG. 3 is a sectional plan view of engine-transmission assembly 20 used for vehicle V1.

Referring to FIGS. 1, 2 and 3, a hybrid vehicle (hereinafter, simply referred to as "vehicle") V1 will be described.

Vehicle V1 is a utility vehicle, for example. Vehicle V1 is equipped with a pair of electric transaxles ET1 serving as right and left front transaxles for driving respective right and left front wheels 14, and is equipped with an engine-transmission assembly 20 for driving right and left rear wheels 24. Engine-transmission assembly 20 is a combination of an engine 21 and a transmission assembly, and the transmission assembly includes a transaxle casing 22, and a belt transmission BT1 for transmitting power from engine 21 into transaxle casing 22. Right and left rear wheels 24 are provided on distal ends of respective right and left rear axles 23 supported by transaxle casing 22. Transaxle casing 22 incorporates a forward traveling gear train FG, a backward traveling gear train RG, and a differential gear unit D differentially connecting proximal ends of right and left rear axles 23 to each other. Either forward traveling gear train FG or backward traveling gear train RG is selected to transmit power from belt transmission BT1 to differential gear unit D.

Further, vehicle V1 is equipped with a generator 19 that is driven by driving engine 21 so as to generate electric power, and is equipped with a battery 18 for reserving the electric power generated by generator 19 and for supplying the electric power to electric motors 2 of respective electric transaxles ET1.

Referring to FIGS. 1 and 2, each of right and left electric transaxles ET1 will be described. Electric transaxle ET1 includes a reduction gear casing 1, an axle 12, an electric motor 2, and a reduction gear train RG1 disposed in reduction gear casing 1 so as to transmit power from electric motor 2 to axle 12.

Axle 12 is journalled by reduction gear casing 1 via a bearing 16, and is extended outward from reduction gear casing 1 through an opening of reduction gear casing 1 so as to be fixedly provided on a distal end portion thereof with a hub 13 that is fixed to a rim 14a of front wheel 14. The opening of reduction gear casing 1 passing axle 12 therethrough is covered with a cover 1a. Axle 12 is formed with a flange 12a on a proximal end portion thereof disposed in reduction gear casing 1, and flange 12a is journalled by reduction gear casing 1 via a bearing 15.

Electric motor 2 is fastened to reduction gear casing 1 via a bolt 17 and so on. A motor output shaft 3 of electric motor 2 is inserted at a tip thereof into reduction gear casing 1 and is extended coaxially to axle 12. Reduction gear train RG1 interposed between motor output shaft 3 and axle 12 will be detailed. A motor output gear 4 is fixed on the tip of motor output shaft 3. A sun gear 8 is disposed between the tip of motor output shaft 3 and flange 12a of axle 12 coaxial to motor output shaft 3 and axle 12. Sun gear 8 is fixedly fitted into a carrier 7 that is disposed between the tip of motor output shaft 3 and flange 12a of axle 12, so that sun gear 8 is rotatably integral with carrier 7. Carrier 7 is extended from sun gear 8 in a radial direction of motor output shaft 3 and axle 12, and pivotally supports a planetary gear 5 via a pivot shaft 6 extended parallel to motor output shaft 3 and axle 12. Planetary gear 5 meshes with motor output gear 4.

Further, an internal gear 10 is fixed on an inner peripheral surface of reduction gear casing 1, and planetary gear 5 meshes with internal gear 10. On the other hand, flange 12a of axle 12 pivotally supports a planetary gear 9 via a pivot shaft 11 extended parallel to motor output shaft 3 and axle 12. Planetary gear 9 meshes with sun gear 8, and meshes with internal gear 10. In this way, motor output gear 4, planetary gear 5, sun gear 8, planetary gear 9 and internal gear 10 constitute reduction gear train RG1.

Power of electric motor 2 is transmitted to axle 12 via reduction gear train RG1 in the following way. When motor output gear 4 rotates together with motor output shaft 3, planetary gear 5 is rotated by the rotation of motor output gear 4 so as to revolve along internal gear 10 around an axis of motor output shaft 3. The revolution of planetary gear 5 causes rotation of carrier 7 centered on an axis of sun gear 8, thereby causing rotation of sun gear 8 centered on its own axis. Planetary gear 9 is rotated by the rotation of sun gear 8 so as to revolve along internal gear 10 around an axis of axle 12. The revolution of planetary gear 9 causes rotation of flange 12a centered on the axis of axle 12, thereby causing rotation of axle 12 centered on its own axis. In this way, due to internal gear 10, the rotation of planetary gear 5 following the rotation of motor output gear 4 is converted into the revolution of planetary gear 5 such as to reduce the rotary speed of sun gear 8, and then, the rotation of planetary gear 9 following the speed-reduced rotation of sun gear 8 is converted into the revolution of planetary gear 9 such as to further reduce the rotary speed of axle 12. Therefore, reduction gear train RG1 has a great reduction gear ratio while ensuring its compactness.

Electric motors 2 of respective right and left electric transaxles ET1 are supplied with electric power from battery 18, and their turning on and off and their output rotary speeds are controlled by a controller (not shown) provided in vehicle V1. Especially, to turn vehicle V1, the output rotary speeds of electric motors 2 of right and left electric transaxles ET1 are differentially controlled so as to differentially rotate right and left front wheels 14.

Electric motor 2 may be configured as a motor generator which regenerates kinetic energy into electric energy. Therefore, electric motor 2 can serve as a regeneration brake. In this regard, electric motor 2 may be configured so as to be switched on to function as an electric motor for setting vehicle V1 into the four-wheel drive mode when a slip of a belt 28 in a later-discussed belt transmission BT1 is detected.

Engine and transmission system 20 will be detailed with reference to FIGS. 1 and 3. Belt transmission BT1 includes a belt transmission cover 25, pulleys 27 and 29 and a belt 28. An engine output shaft 26 of engine 21 is extended into belt transmission cover 25 so as to serve as an input shaft of belt transmission BT1. A transmission input shaft 30 of the gear transmission in transaxle casing 22 is extended outward from transaxle casing 22 in parallel to engine output shaft 26 and into belt transmission cover 25 so as to serve as an output shaft of belt transmission BT1. In belt transmission cover 25, pulley 27 is provided on engine output shaft 26, pulley 29 is provided on transmission input shaft 30, and belt 28 is interposed between pulleys 27 and 29. Belt transmission BT1 is a continuously variable transmission (CVT), in which pulleys 27 and 29 are split pulleys, configured so that a ratio of a radius of a looping portion of belt 28 in pulley 27 round engine output shaft 26 to a radius of a looping portion of belt 28 in pulley 29 round transmission input shaft 30 is variable.

Generator 19 is disposed around engine output shaft 26 in belt transmission cover 25. Generator 19 includes a stator 21a fixed to engine 21, and includes a rotor 27a fixed to pulley 27. Stator 21a is provided with armature windings 21b, and rotor 27a is provided with magnets 27b. Stator 21a and rotor 27a are disposed so that magnets 27b face armature windings 21b. Therefore, when stator 27a rotates together with engine output shaft 26, armature windings 27a are excited by rotating magnets 27b so as to generate electric power to be reserved in battery 18.

In transaxle casing 22, transmission input shaft 30, a counter shaft 31, and right and let coaxial axles 23 are extended in parallel and are journalled by transaxle casing 22 via bearings. In detail, transaxle casing 22 includes right and left gear housings 22a and 22b and right and left brake housings 22c and 22d. Right and left gear housings 22a and 22b are joined to each other at a vertical joint plane so as to define a gear chamber of transaxle casing 22 incorporating forward traveling gear train FG, backward traveling gear train RG and differential gear unit D. Right brake housing 22c is joined to right gear housing 22a so as to extend rightward from right gear housing 22a, thereby journaling right axle 23 via bearings, and thereby defining a right brake chamber of transaxle casing 22 incorporating a right brake 44 for braking right axle 23. Left brake housing 22d is joined to left gear housing 22b so as to extend leftward from left gear housing 22b, thereby journaling left axle 23 via bearings, and thereby defining a left brake chamber of transaxle casing 22 incorporating a left brake 44 for braking left axle 23. Right and left axles 23 project rightwardly and leftwardly outward from right and left brake housings 22c and 22d, respectively, so as to be provided on respective distal ends thereof with respective right and left rear wheels 24.

In each of the right and left brake chambers of transaxle casing 22, friction discs that are unrotatable relative to corresponding axle 23 and friction discs that are unrotatable relative to transaxle casing 22 are alternately aligned so as to constitute each of right and left brakes 44. A brake shoe 45 is disposed in each of the right and left brake chambers between each brake 44 and each of right and left gear housings 22a and 22b. Right and left brake arms 46 are pivoted on outer portions of respective right and left brake housings 22c and 22d, and are operatively connected to respective brake shoes 45 and to a brake manipulator (not shown) of vehicle V1. When the brake manipulator is operated for braking, brake arms 46 are rotated to move respective brake shoes 45 toward respective brakes 44 so as to press the friction discs of respective brakes 44 against one another, thereby applying brakes 44 to stop right and left axles 23. When the brake manipulator is operated for unbraking, brake arms 46 are rotated to move respective brake shoes 45 away from respective brakes 44 so as to separate the friction discs of respective brakes 44 from one another, thereby allowing rotation of right and left axles 23 freely from respective brakes 44.

In the gear chamber of transaxle casing 22, a centrifugal governor 47 is provided on transmission input shaft 30. Centrifugal governor 47 detects the rotary speed of transmission input shaft 30 (serving as the output shaft of belt transmission BT1) and controls engine 21 to change the rotary speed of engine output shaft 26 (serving as the input shaft of belt transmission BT1) in correspondence to the detected rotary speed of transmission input shaft 30.

In the gear chamber of transaxle casing 22, a forward traveling drive gear 32 and a backward traveling drive gear 33 are formed (or fixed) on transmission input shaft 30. In the gear chamber of transaxle casing 22, a forward traveling driven gear 34 and a backward traveling driven gear 35 are fitted on counter shaft 31 so as to be rotatable relative to counter shaft 31. Forward traveling drive gear 32 and forward traveling driven gear 34 mesh with each other so as to constitute forward traveling gear train FG. Backward traveling drive gear 33 and backward traveling driven gear 35 mesh with an idle gear (not shown) so that backward traveling drive gear 33, the idle gear and backward traveling driven gear 35 constitute backward traveling gear train RG. Further, a pinion 37 is formed (or fixed) on counter shaft 31 so as to transmit the rotary force of counter shaft 31 to later-discussed differential gear unit D.

Counter shaft 31 is formed with a spline portion between gears 34 and 35, and a reverser shifter 36 is spline-fitted on the spline portion of counter shaft 31 so that reverser shifter 36 is unrotatable relative to counter shaft 31 and is axially slidable on counter shaft 31. Gears 34 and 35 are formed with notches in respective portions thereof facing reverser shifter 36. Reverser shifter 36 is formed on axial opposite ends thereof with teeth to be fitted into the notches of respective gears 34 and 35. The notches of forward traveling driven gear 34 and the teeth on one end of reverser shifter 36 facing forward traveling driven gear 34 constitute a dog clutch for forward traveling rotation of axles 23. The notches of backward traveling driven gear 35 and the teeth on the other end of reverser shifter 36 facing backward traveling driven gear 35 constitute a dog clutch for backward traveling rotation of axles 23.

Reverser shifter 36 can be shifted among a forward traveling position, a neutral position and a backward traveling position. When reverser shifter 36 is disposed at the forward traveling position, the teeth on one end of reverser shifter 36 are fitted into the notches of forward traveling driven gear 34 so as to rotatably integrate forward traveling driven gear 34 with counter shaft 31 via reverser shifter 36, so that the rotary force of transmission input shaft 30 driven by engine 21 via belt transmission BT1 is transmitted to counter shaft 31 via forward traveling gear train FG, thereby rotating axles 23 in the forward traveling rotation direction of rear wheels 24. When reverser shifter 36 is disposed at the backward traveling position (as shown in FIG. 3), the teeth on the other end of reverser shifter 36 are fitted into the notches of backward traveling driven gear 35 so as to rotatably integrate backward traveling driven gear 35 with counter shaft 31 via reverser shifter 36, so that the rotary force of transmission input shaft 30 is transmitted to counter shaft 31 via backward traveling gear train RG, thereby rotating axles 23 in the backward traveling rotation direction of rear wheels 24. When reverser shifter 36 is disposed at the neutral position (as shown in FIG. 1), neither forward traveling driven gear 34 nor backward traveling driven gear 35 has the teeth of reverser shifter 36 in the notches thereof, so that gears 34 and 35 are allowed to rotate relative to counter shaft 31, thereby preventing the rotary force of transmission input shaft 30 from being transmitted to counter shaft 31, and thereby making axles 23 free from the power of engine 21.

In the gear chamber of transaxle casing 22, differential gear unit D differentially connects proximal end portions of right and left axles 23 to each other. Differential gear unit D includes a differential input gear (bull gear) 38, a differential casing 39, a pivot shaft 40, bevel differential pinions 41 and right and left bevel differential side gears 42. Right and left axles 23 are journalled by respective right and left gear housings 22a and 22b via respective bearings and are extended at the respective proximal ends thereof into the gear chamber of transaxle casing 22 so as to be inserted into differential casing 39, so that axles 23 are rotatable relative to differential casing 39. In differential casing 39, right and left bevel differential side gears 42 are fixed on the proximal ends of respective right and left axles 23.

Differential input gear 38 is fixed on differential casing 39 and meshes with pinion 37 on counter shaft 31. Pivot shaft 40 is extended in a radial direction of axles 23, and is fixed to differential casing 39 so as to be rotatably integral with differential casing 39 and differential input gear 38. Bevel differential pinions 41 are pivoted on pivot shaft 40. Each of bevel differential pinions 41 meshes with both right and left differential side gears 42.

Due to the above-mentioned structure, transmission input shaft 30 receives the power of engine 21 via belt transmission BT1, and in transaxle casing 22, either forward traveling gear train FG or backward traveling gear train RG is selected by reverser shifter 36 so as to transmit the power of engine 21 from transmission input shaft 30 to counter shaft 31, thereby transmitting the power of engine 21 from counter shaft 31 to right and left rear wheels 24 via pinion 37, differential gear unit D and right and left axles 23.

As understood from the above-mentioned structure and FIG. 1, vehicle V1 is provided with neither means for distributing the power of engine 21 to front wheels 14 nor means for distributing the power of electric motors 2 to rear wheels 24. This is because vehicle V1 rather sets importance on the advantages in structural simplicity and reduction of components and costs. Assumptive driving modes of vehicle V1 are two types of 2WD (two wheel drive) mode: a first 2WD mode to drive vehicle V1 by driving only rear wheels 24 by power of engine 21; and a second 2WD mode to drive vehicle V1 by driving only front wheels 14 by power of electric motors 2.

In this regard, vehicle V1 is provided with a mode selection means, e.g., a switch, a button, a dial, a lever or a pedal, which is operated to select either the first 2WD mode where only rear wheels 24 are driven by engine 21 or the second 2WD mode where only front wheels 14 are driven by electric motors 2. Therefore, an operator who drives vehicle V1 can optionally select either the first 2WD for obtaining silence or the second 2WD for obtaining high power.

Various changes and modifications may be made in vehicle V1. For example, vehicle V1 may be alternatively provided with engine-transmission assembly 20 for driving right and left front wheels 14 and with the pair of electric transaxles ET1 for driving right and left rear wheels 24. Further, it is possible that vehicle V1 can travel in 4WD (four wheel drive) mode, where front wheels 14 are driven by electric motors 2 of electric transaxles ET1 and simultaneously rear wheels 24 are driven by engine 21 of engine-transmission assembly 20, if rotary speeds of front wheels 14 and rear wheels 24 can be equalized well. Incidentally, if vehicle V1 is provided with means, e.g., a propeller shaft and universal joints, for transmitting power from electric motors 2 to rear wheels 24 and/or for transmitting power from engine 21 to front wheels 14, front wheels 14 can be driven by combined powers of electric motors 2 and engine 21 and/or rear wheels 24 can be driven by combined powers of engine 21 and electric motors 2.

Figure 4:
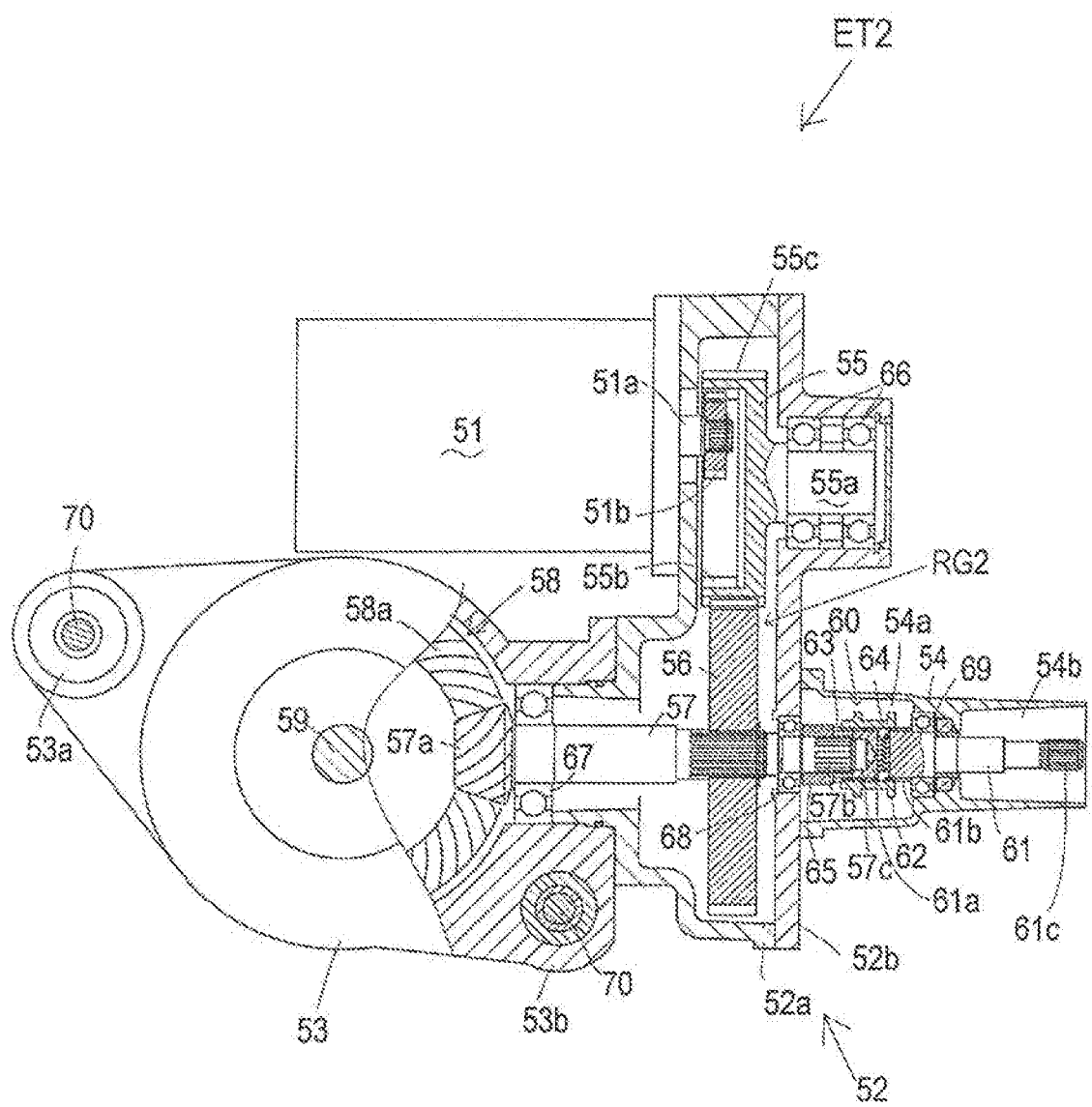
FIG. 4 is a side view partly in section of an electric transaxle ET2.

Referring to FIG. 4, an electric transaxle ET2 will be described. Electric transaxle ET2 is defined as a transaxle integrated with an electric motor 51. Electric transaxle ET1 includes a reduction gear casing 52, a differential gear casing 53, and a power taking-off (PTO) casing 54. Reduction gear casing 52 includes a main housing 52a and a cover 52b joined to each other. Electric motor 51 and differential gear casing 53 are fixed to main housing 52a of reduction gear casing 52 so as to be cantilevered from reduction gear casing 52 in the same direction. PTO casing 54 is fixed to cover 52b of reduction gear casing 52 so as to extend from reduction gear casing 52 opposite to electric motor 51 and differential gear casing 53. Hereinafter, it is assumed that electric motor 51 and differential gear casing 53 are extended rearward from reduction gear casing 52, and PTO casing 54 is extended forward from reduction gear casing 52.

Electric motor 51 has a motor output shaft 51a that is extended into reduction gear casing 52. A motor output pinion 51b is fixed on motor output shaft 51a in reduction gear casing 52. A gear member 55 is formed with a cup-shaped portion and with an axial shaft 55a extended from the cup-shaped portion thereof. Gear member 55 is disposed in reduction gear casing 52 so as to have axial shaft 55a journalled by cover 52a via bearings 66. Axial shaft 55a of gear member 55 is extended in the axial direction of motor output shaft 51a. However, axial shaft 55a is axially offset from motor output shaft 51a in the radial direction of motor output shaft 51a, i.e., axial shaft 55a is not coaxial to motor output shaft 51a.

An inner peripheral surface of the cup-shaped portion of gear member 55 is toothed to form an inner peripheral gear 55b, and an outer peripheral surface of the cup-shaped portion of gear member 55 is toothed to form an outer peripheral gear 55c. Motor output shaft 51a is inserted into the cup-shaped portion of gear member 55 so that motor output pinion 51b meshes with inner peripheral gear 55b of gear member 55.

Motor output pinion 51b and inner peripheral gear 55b constitute a reduction gear train that is advantageous in its compactness and its large reduction gear ratio. More specifically, when viewed in the axial direction of motor output shaft 51a and axial shaft 55a, motor output pinion 51b is disposed within a circle defined by inner peripheral gear 55b, thereby achieving the compactness, especially, minimizing the gear arrangement in radial directions of axial shaft 55a. Further, even in the case that the diametrical size of gear member 55 (i.e., the diameter of inner peripheral gear 55b) is limited, the diametrical difference between motor output pinion 51b and inner peripheral gear 55b can be increased by reducing the diametrical size of motor output pinion 51b, thereby ensuring a large reduction gear ratio as well as the compactness.

However, it should be considered that as the diametrical size of motor output pinion 51b is reduced, the axial offset degree of electric motor 51 from gear member 55 (i.e., the deviation of motor output shaft 51a from axial shaft 55a in the radial direction of gear member 55) is increased. Therefore, to allow the diametrical size reduction of motor output pinion 51b relative to inner peripheral gear 55b for ensuring the large reduction gear ratio, electric transaxle ET2 is configured so that electric motor 51 can be mounted on a portion of reduction gear casing 52 such as to ensure the required axial offset degree of electric motor 51 from gear member 55 in reduction gear casing 52.

A final reduction gear 56 is disposed in reduction gear casing 52 and meshes with outer peripheral gear 55c of gear member 55. As a result, motor output pinion 51b, inner peripheral gear 55b, outer peripheral gear 55c and final reduction gear 56 constitute an entire reduction gear train RG2 in reduction gear casing 52. Final reduction gear 56 is fixed on a reduction output shaft 57. Reduction output shaft 57 is journalled by main housing 52a of reduction gear casing 52 via a bearing 67, and is journalled by cover 52b of reduction gear casing 52 via a bearing 68 so as to extend in the axial direction of motor output shaft 51a. A rear end portion of reduction output shaft 57 is inserted into differential gear casing 53 via main housing 52a of reduction gear casing 52. A bevel pinion 57a is formed on the rear end portion of reduction output shaft 57 in differential gear casing 53.

A differential gear unit 58 is disposed in differential gear casing 53 so as to differentially connect proximal ends of right and left axles 59 to each other. Differential gear unit 58 has a bevel input gear 58a that meshes with bevel pinion 57a. Right and left axles 59 are journalled by differential gear casing 53 and are extended rightwardly and leftwardly (perpendicular to the axial direction of motor output shaft 51*a*) outward from differential gear casing 53.

PTO casing 54 is formed in a rear portion thereof with a clutch chamber 54*a*, and is formed in a front portion thereof with a PTO shaft chamber 54*b* that is opened forwardly outward. A PTO shaft 61 is journalled via a bearing 69 by a partitioning wall of PTO casing 54 formed between chambers 54*a* and 54*b*. A rear end portion 61*b* of PTO shaft 61 is splined on an outer peripheral surface thereof, and is formed therein with a rearwardly opened recess 61*a*. Rear end portion 61*b* of PTO shaft 61 is disposed in clutch chamber 54*a*. A front end portion 61*c* of PTO shaft 61 is splined on an outer peripheral surface thereof, and is disposed in PTO chamber 54*b*. A front portion 57*b* of reduction output shaft 57 is splined on an outer peripheral surface thereof, and is disposed in clutch chamber 54*a*. A front end projection 57*c* that is diametrically smaller than splined front portion 57*b* of reduction output shaft 57 projects forward from splined front portion 57*b*, and is inserted into recess 61*a* of PTO shaft 61 in clutch chamber 54*a*, so that reduction output shaft 57 is rotatable relative to PTO shaft 61.

A clutch 60 is interposed between reduction output shaft 57 and PTO shaft 61 in clutch chamber 54*a*. Clutch 60 includes a clutch slider 62, a spline hub 63, a detent assembly 64 and a spacer 65. Spline hub 63 is fixed on splined front portion 57*b* of reduction output shaft 57, and spacer 65 is fixed on reduction output shaft 57 between spline hub 63 and cover 52*b* of reduction gear casing 52. Clutch slider 62 is fitted on the splined outer peripheral surface of rear end portion 61*b* of PTO shaft 61 so as to be axially slidable on PTO shaft 61 and so as to be unrotatable relative to PTO shaft 61. Detent assembly 64 includes a pair of balls and a compressed spring sandwiched between the balls, and is fitted in a diametric through hole of PTO shaft 61, so that the balls are pressed against clutch slider 62 by the spring.

Clutch slider 62 can be shifted between a clutch-on position and a clutch-off position, and can be held at either the clutch-on position or the clutch-off position by detent assembly 64. When clutch slider 62 is disposed at the clutch-on position, clutch slider 62 meshes with spline hub 63 (as shown in FIG. 4) so that PTO shaft 61 is rotatably integrated with reduction output shaft 57 so as to receive the output of electric motor 51. When clutch slider 62 is disposed at the clutch-off position, clutch slider 62 does not mesh with spline hub 63 so that PTO shaft 61 is rotatably free from reduction output shaft 57 so as to be isolated from the output of electric motor 51.

Figure 5:
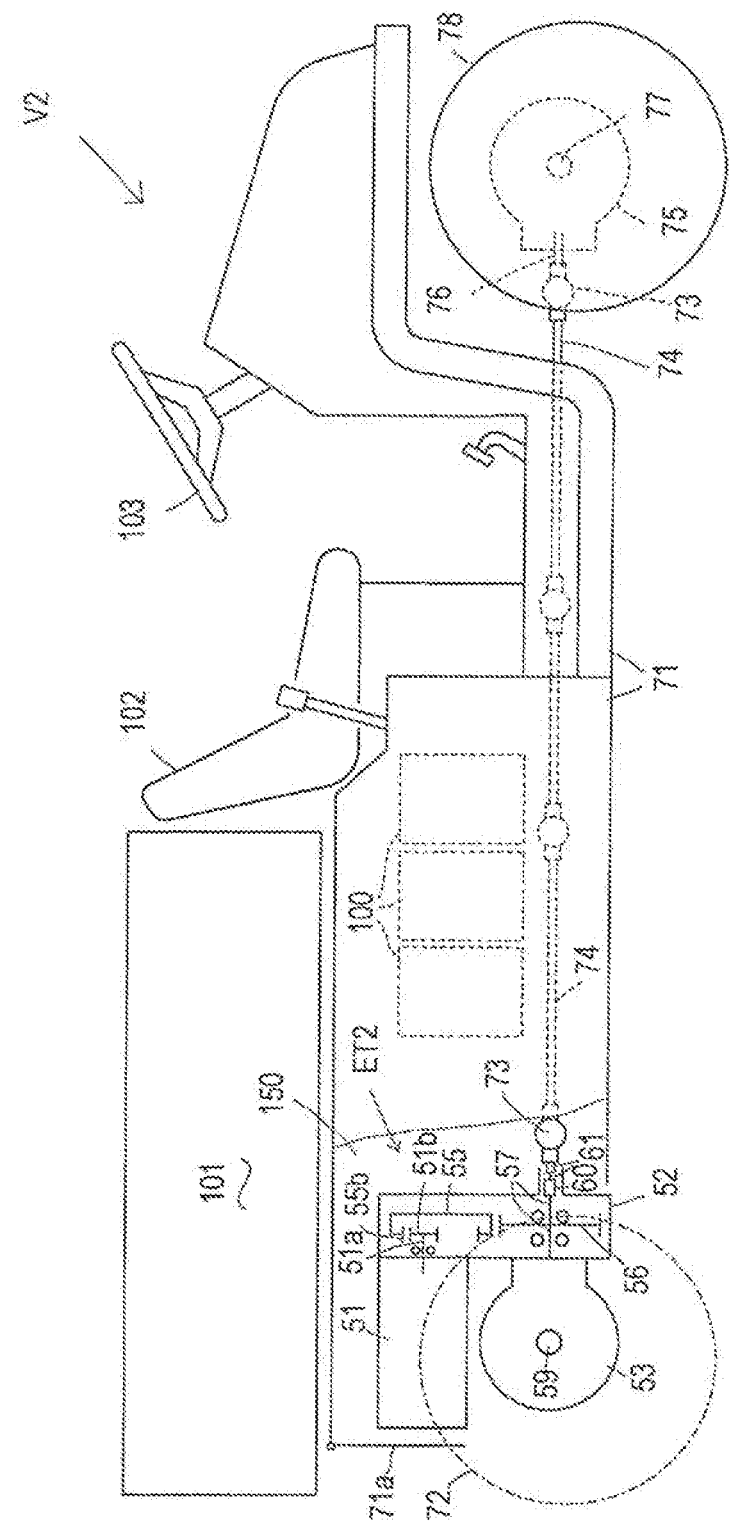
FIG. 5 is a schematic side view of an electric utility vehicle V2 equipped with electric transaxle ET2 serving as a rear transaxle from which power is taken and transmitted into a front transaxle casing via a propeller shaft.

Referring to FIGS. 4 and 5, an electric utility vehicle (hereinafter, simply referred to as "vehicle") V2 equipped with electric transaxle ET2 will be described. Vehicle V2 has a vehicle body frame 71 extended from a front end thereof to a rear end thereof. A rear portion of vehicle body frame 71 is formed as a base 150, and a load carrying bed 101 is mounted on a top of base 150. A front portion of base 150 projects forward from load carrying bed 101 when viewed in plan, and an operator's seat 102 is mounted on this front portion of bed 150 so as to be disposed immediately forward of load carrying bed 101. Base 150 is open at the top thereof, and load carrying bed 101 and seat 102 are rotatable vertically in the fore-and-aft direction so that a space defined by base 150 can be opened upward by rotating load carrying bed 101 and seat 102.

Electric transaxle ET2 is disposed in the space defined by base 150 under load carrying bed 101 so as to serve as a rear transaxle supporting right and left rear axles 59, and right and left rear wheels 72 are drivingly connected to distal ends of respective right and left axles 59 via respective suspensions. In this regard, as shown in FIG. 4, differential gear casing 53 of electric transaxle ET2 is formed with bosses 53*a* and 53*b*, and is fastened to vehicle body frame 71 via bolts 70 passed through respective bosses 53*a* and 53*b*, thereby mounting electric transaxle ET2 onto vehicle body frame 71. Further, electric transaxle ET2 is disposed so as to extend electric motor 51 and differential gear casing 53 supporting right and left axles 59 rearward from reduction gear casing 52 so that electric motor 51 and differential gear casing 53 are vertically offset from each other (more specifically, electric motor 51 is disposed above differential gear casing 53) so as to overlap each other when viewed in plan and so that PTO casing 54, incorporating PTO clutch 60 and PTO shaft 61, extends forward from reduction gear casing 52.

In other words, transaxle ET2 is disposed below load carrying bed 101 so as to overlap load carrying bed 101 when viewed in plan. Therefore, the dead space under load carrying bed 101 is utilized for arranging transaxle ET2 so as to expand a later-discussed operator's space forward of load carrying bed 101 while ensuring compactness of entire vehicle V2.

Further, reduction gear casing 52 and differential gear casing 53 constitute a transaxle casing of transaxle ET2. Reduction gear casing 52 serves as a portion of the transaxle casing incorporating a drive train for transmitting power of electric motor 51 to axles 59. Differential gear casing 53 serves as a portion of the transaxle casing supporting axles 59. In other words, electric motor 51 and the portion of the transaxle casing incorporating axles 59 are extended from the portion of the transaxle casing incorporating the drive train so as to be vertically offset from each other and so as to overlap each other when viewed in plan. The rearwardly horizontal extension of electric motor 51 and differential gear casing 53 from reduction gear casing 52 is advantageous for vertically minimizing transaxle ET2, and the vertical offsetting of electric motor 51 and differential gear casing 53 overlapping each other when viewed in plan is advantageous for horizontally (fore-and-aft or laterally) minimizing transaxle ET2.

Also, at least one battery 100 for reserving electric power to be supplied to electric motor 51 of transaxle ET2 is disposed in the space defined by base 150 of vehicle V2. In other words, battery (batteries) 100 is disposed below load carrying bed 101 or seat 102 so as to overlap load carrying bed 101 or seat 102 when viewed in plan. In this regard, there is a sufficient room for arranging battery (batteries) 100 in the space defined by base 150 forward of transaxle ET2 that is minimized in the fore-and-aft direction by the vertical offsetting of differential gear casing 53 and electric motor 51 overlapping each other when viewed in plan. Therefore, the dead space in base 150 under load carrying bed 101 and seat 102 is utilized for arranging battery (batteries) 100 so as to expand an available space in vehicle V2 such as the operator's space involving seat 102 forward of load carrying bed 101 while ensuring the compactness of entire vehicle V2.

For example, load carrying bed 101 is rotatable at a front end thereof rearwardly upward centered on a rear end thereof, and seat 102 is rotatable at a rear end thereof forwardly upward centered on a front end thereof. The space in base 150 can be easily opened upward by upwardly rotating load carrying bed 101 and seat 102 so as to be convenient for access to electric transaxle ET2 and battery (or batteries) 100 in the space for exchanging or maintenance. Further, electric motor 51 extended rearward from reduction gear casing 52 is attachable and detachable to and from reduction gear casing 52, and vehicle V2 is configured so that a man's hand can be easily inserted into the space in base 150 via a rear end of vehicle body frame 71 defining the rear end of base 150 so as to handle electric motor 51. In this embodiment of FIG. 5 and in later-discussed embodiments of FIGS. 6, 7 and 9, a vertical plate-shaped rear end portion 71a of vehicle body frame 71 is formed as a hinged door that can be rotated rearward. Alternatively, rear end portion 71a may be vertically slidable, or a small window through which electric motor 51 can be passed may be provided in the rear end of vehicle body frame 71.

Vehicle V2 is further equipped at the front end portion thereof with a front transaxle casing 75 supporting right and left front axles 77, and right and left front wheels 78 are drivingly connected to distal ends of respective right and left front axles 77. Front transaxle casing 75 incorporates a differential unit (not shown) differentially connecting right and left front axles 77 to each other. Front transaxle casing 75, the differential unit in front transaxle casing 75 and axles 77 supported by front transaxle casing 75 constitute a front transaxle. Incidentally, a casing incorporating a differential unit, which is identical to differential gear casing 53 for constituting transaxle ET2, may serve as front transaxle casing 75 incorporating the differential unit for constituting the front transaxle. An input shaft 76 of the differential unit in front transaxle casing 75 projects rearward from front transaxle casing 75, and is drivingly connected to front end portion 61c of PTO shaft 61 of electric transaxle ET2 serving as the rear transaxle via at least one propeller shaft 74 and universal joints 73.

A steering wheel 103 for steering right and left steerable front wheels 78 is disposed forward of seat 102, so that vehicle V2 has an operator's space involving seat 102 and steering wheel 102 forward of load carrying bed 101. As mentioned above, both battery (batteries) 100 and electric transaxle ET2 are accommodated in the space in base 150 under load carrying bed 101 and seat 102 so that battery (batteries) 100 disposed forward of electric transaxle ET2 overlaps load carrying bed 101 or seat 102 so as not to project forward from the dead space under seat 102, thereby ensuring the sufficiently large operator's space forward of load carrying bed 101.

Further, an end of battery 100 toward the front transaxle, i.e., a front end of battery 100 (if a plural of batteries 100 are provided, a front end of foremost battery 100) is disposed in the space in base 150 so as to be closer to a front end of electric transaxle ET2 serving as the rear transaxle than a rear end of front transaxle casing 75 serving as the front transaxle. In other words, a distance of the front transaxle (front transaxle casing 75) from the front end of battery 100 is longer than a distance of the rear transaxle (electric transaxle ET2) from the front end of battery 100. The longer distance of the front transaxle from the front end of battery 100 generally defines the fore-and-aft length of the operator's space. Therefore, the arrangement of the front end of battery 100 closer to the rear transaxle is advantageous for expanding the operator's space in the fore-and-aft direction.

In this way, vehicle V2 is driven by only the electric power from electric motor 51. Vehicle V2 can be driven in a four-wheel drive (4WD) mode where both rear wheels 72 and front wheels 78 are driven by setting clutch slider 62 of clutch 60 at the clutch-on position, and vehicle V2 can be driven in a two-wheel drive (2WD) mode where only rear wheels 72 are driven by setting clutch slider 62 of clutch 60 at the clutch-off position.

Further, the output rotary speed of electric motor 51 is variable so that vehicle V2 can travel at various speeds, and the output rotary direction of electric motor 51 is reversible so that vehicle V2 can travel forward and backward.

Figure 6:
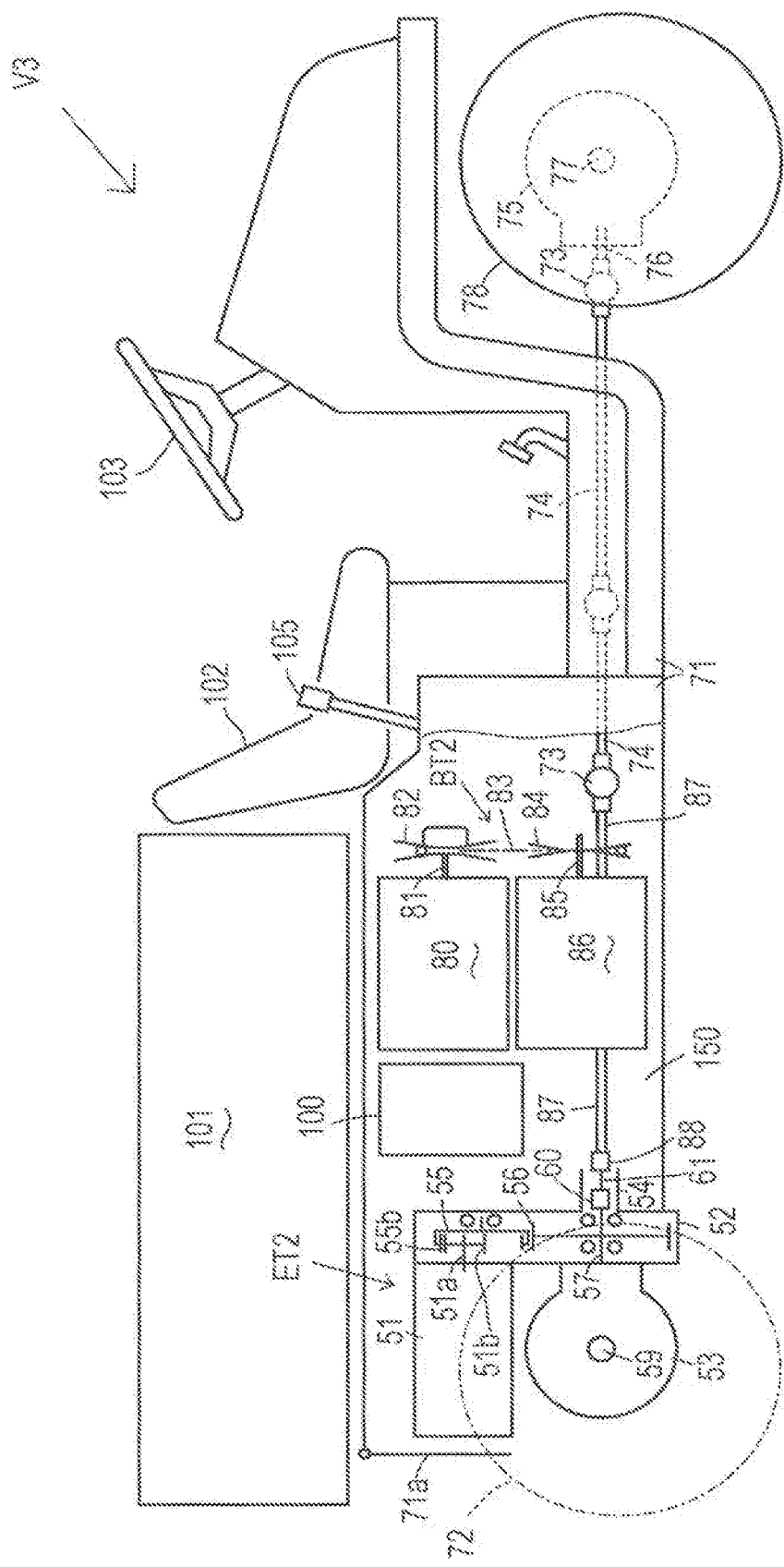
FIG. 6 is a schematic side view of a hybrid utility vehicle V3 equipped with electric transaxle ET2 serving as a rear transaxle, and equipped with an engine 80 whose power can be transmitted to the front transaxle casing or/and electric transaxle ET2 serving as the rear transaxle.

Referring to FIGS. 4 and 6, a hybrid utility vehicle (hereinafter, simply referred to as "vehicle") V3 equipped with electric transaxle ET2 will be described. The same reference numerals as those used in FIG. 5 designate members that are identical to the above-mentioned members in the embodiment of FIG. 5 or have the same functions as mentioned above. Vehicle V3 is equipped with electric transaxle ET2 supporting rear wheels 72, and is equipped with front transaxle casing 75 supporting front wheels 78, similar to vehicle V2. In the space defined by base 150 under load carrying bed 101 and seat 102, engine 80 is mounted on vehicle body frame 71 so that electric motor 51 of electric transaxle ET2 and engine 80 serve as prime movers for driving wheels 72 and 78 of vehicle V3. Further, vehicle V3 is equipped with at least battery 100 for reserving electric power to be supplied to electric motor 51.

Further, in the space defined by base 150, a transmission casing 86 is mounted on vehicle body frame 71. It appears in FIG. 6 that engine 80 is disposed above transmission casing 86, however, this arrangement is only for convenience to expression of engine 80 and transmission casing 86 in FIG. 6. In fact, engine 80 and transmission casing 86 may be juxtaposed right and left. Transmission casing 86 incorporates a transmission mechanism (not shown) such as a gear transmission. An engine output shaft 81 of engine 80 and a transmission input shaft 85 of the transmission mechanism in transmission casing 86 are extended parallel to each other.

Since engine 80 and transmission casing 86 are disposed in the space in base 150, each of engine 80 and transmission casing 86 is disposed below load carrying bed 101 or seat 102 so as to overlap load carrying bed 101 or seat 102 when viewed in plan. In this regard, each of engine 80 and transmission casing 86 may be disposed so as to be covered with both load carrying bed 101 and seat 102 (i.e., covered at a part thereof with load carrying bed 101 and at another part thereof with seat 102) or so as to be entirely covered with only load carrying bed 101 or with only seat 102. Therefore, the dead space in base 150 below load carrying bed 101 and seat 102 is utilized for arranging engine 81 and transmission casing 86 so as to ensure the operator's space of vehicle V3 with seat 102 and steering wheel 103.

A belt transmission BT2 is interposed between engine output shaft 81 and transmission input shaft 85 Belt transmission BT2 includes a pulley 82 provided on engine output shaft 81, a pulley 84 provided on transmission input shaft 85, and a belt 83 interposed between pulleys 82 and 84. Due to the above-mentioned arrangement of engine 81 and transmission casing 86, belt transmission BT2 is also disposed in the space in base 150 under load carrying bed 101 and seat 102 so as not to project forward into the operator's space of vehicle V3.

Similar to the space in base 150 of vehicle V1, the space in base 150 of vehicle V2 can be opened upward by upwardly rotating load carrying bed 101 and seat 102 so as to be convenient for access to the members in the space, i.e., electric transmission ET2, battery 100, engine 80, transmission casing 86 and belt transmission BT2 for maintenance or another purpose.

Belt transmission BT2 is a continuously variable transmission (CVT) serving as a main speed changing transmission, and the transmission in transmission casing 86 is a variable speed transmission that is a sub speed changing transmission driven by the main speed changing transmission. Alternatively, only one of belt transmission BT2 and the transmission in transmission casing 86 may have variable speeds. Therefore, vehicle V3 can travel at various speeds when it is driven by power of electric motor 51 as well as power of engine 80.

A transmission output shaft 87 of the transmission in transmission casing 86 projects at a rear end portion thereof rearwardly outward from transmission casing 86, and projects at a front end portion thereof forwardly outward from transmission casing 86. Vehicle V3 is provided with a not-shown clutch (hereinafter, referred to as "engine clutch"), which is clutched on to transmit power from engine 80 to transmission output shaft 87, and which is clutched off to isolate transmission output shaft 87 from the power of engine 80 (in other words, to isolate engine 80 from rotational force of transmission output shaft 87). The engine clutch is disposed on any portion of the power train between engine 80 and transmission output shaft 87. For example, the engine clutch may be a tension clutch in belt transmission BT2, or the engine clutch may be interposed between engine output shaft 81 and pulley 82 or between transmission input shaft 85 and pulley 84, or a shifter of the transmission in transmission casing 86 may serve as the engine clutch.

The transmission in transmission casing 86 is provided with a reverser (not shown) for reversing the rotational direction of transmission output shaft 87, while the rotational direction of engine output shaft 81 is constant. Therefore, vehicle V3 can travel either forward or backward depending on selection of the rotational direction of motor output shaft 51a in electric transaxle ET2 when vehicle V3 is driven by the power of electric motor 51, and vehicle V3 can travel either forward or backward depending on operation of the reverser in transmission casing 86 for selecting the rotational direction of transmission output shaft 87 when vehicle V3 is driven by the power of engine 80.

The front end portion of transmission output shaft 87 is drivingly connected to input shaft 76 projecting rearward from front transaxle casing 75 via at least one propeller shaft 74 and universal joints 73.

The rear end portion of transmission output shaft 87 is drivingly connected to PTO shaft 61 via a coupler 88. For example, coupler 88 is a sleeve whose inner peripheral surface is splined, and the rear end portion of transmission output shaft 87 is splined on the outer peripheral surface thereof, so that the splined rear portion of transmission output shaft 87 and above-mentioned splined front end portion 61c of PTO shaft 61 are spline-fitted into coupler 88, thereby rotatably integrating reduction output shaft 57 and PTO shaft 61 with transmission output shaft 87 when clutch 60 is clutched on. Alternatively, a universal joint or a propeller shaft with universal joint may be interposed between transmission output shaft 87 and PTO shaft 61 so as to drivingly connect transmission output shaft 87 to PTO shaft 61.

In vehicle V3, PTO shaft 61 for transmitting power of electric motor 51 to front wheels 72 also serves as an input shaft of electric transaxle ET2 for receiving power from engine 80.

When clutch 60 is clutched on, vehicle V3 travels in 4WD mode where rear wheels 72 and front wheels 78 are driven by only the power of electric motor 51, by only the power of engine 80, or by the powers of both electric motor 51 and engine 80. On the assumption that clutch 60 is clutched on, vehicle V3 travels in the 4WD mode by only the power of electric motor 51 when electric motor 51 is driven to drive motor output shaft 51a, and the engine clutch is clutched off regardless of whether engine 80 is driven or not. At this time, PTO shaft 61 transmits power of electric motor 51 to front wheels 78 via transmission output shaft 87 and at least one propeller shaft 74.

On the same assumption, vehicle V3 travels in the 4WD mode by only the power of engine 80 when electric motor 51 is not driven to drive motor output shaft 51a, engine 80 is driven and the engine clutch is clutched on. At this time, the rotary force of transmission output shaft 87 driven by engine 80 is distributed to rear wheels 72 via PTO shaft 61, differential gear unit 58 and axles 59, and to front wheels 78 via at least one propeller shaft 74, input shaft 76, the differential unit in front transaxle casing 75 and axles 77. Further, motor output shaft 51a is driven by the power of engine 80 via reduction gear train RG2 so that electric motor 51 functions as a generator for generating electric power. The electric power generated by electric motor 51 is reserved in battery 100 for supplying the electric power to electric motor 51.

On the same assumption, vehicle V3 travels in the 4WD mode by the powers of electric motor 51 and engine 80 when electric motor 51 is driven to drive motor output shaft 51a, engine 80 is driven and the engine clutch is clutched on. At this time, reduction output shaft 57 receives the power of electric motor 51 via reduction gear train RG2, and receives the power of engine 80 via transmission output shaft 87 and PTO shaft 61, so as to transmit the combined power of electric motor 51 and engine 80 to rear wheels 72 via differential gear unit 58 and axles 59. Meanwhile, transmission output shaft 87 receives the power of engine 80 via belt transmission BT2 and the transmission in transmission casing 86, and receives the power of electric motor 51 via reduction gear train RG2, reduction output shaft 57 and PTO shaft 61, so as to transmit the combined power of electric motor 51 and engine 80 to front wheels 78 via at least one propeller shaft 74, input shaft 76 and axles 77. In other words, electric motor 51 and engine 80 assist each other to drive front and rear wheels 78 and 72.

When clutch 60 is clutched off, vehicle V3 travels in 2WD mode where either rear wheels 72 or front wheels 78 are driven by only the power of electric motor 51 or by only the power of engine 80. On the assumption that clutch 60 is clutched off, vehicle V3 travels in the 2WD mode where only rear wheels 72 is driven by only the power of electric motor 51 when electric motor 51 is driven to drive motor output shaft 51a, and the engine clutch is clutched off regardless of whether engine 80 is driven or not. At this time, reduction output shaft 57 receives the power of electric motor 51 via reduction gear train RG2 so as to drive rear wheels 72, and meanwhile, transmission output shaft 87 drivingly connected to front wheels 78 receives neither the power of electric motor 51 nor the power of engine 80, so that font wheels 78 are not driven.

On the same assumption, vehicle V3 travels in the 2WD mode where only front wheels 78 are driven by only the power of engine 80 when electric motor 51 is not driven to drive motor output shaft 51a, engine 80 is driven and the engine clutch is clutched on. At this time, the rotary force of transmission output shaft 87 driven by engine 80 is transmitted to front wheels 78 via at least one propeller shaft 74, input shaft 76, the differential unit in front transaxle casing 75 and axles 77, and meanwhile, reduction output shaft 57 receives neither the power of electric motor 51 nor the power of engine 80, so that rear wheels 72 are not driven.

Incidentally, it is possible that vehicle V3 travels in 4WD mode even if clutch 60 is clutched off. This 4WD mode is set when clutch 60 is clutched off, electric motor 51 is driven to drive motor output shaft 51a, engine 80 is driven, and the engine clutch is clutched on. In this 4WD mode, rear wheels 72 are driven by only the power of electric motor 51 via reduction gear train RG2, and front wheels 78 are driven by only the power of engine 80 via transmission output shaft 87, because clutch 60 is clutched off to isolate reduction output shaft 57 from the power of engine 80 and to isolate transmission output shaft 87 from the power of electric motor 51. However, the rotary speed of rear wheels 72 driven by electric motor 51 and the rotary speed of front wheels 78 driven by engine 80 have to be controlled to be equal to each other.

The above-mentioned driving modes of vehicle V3 may be automatically selected by a controller based on detection of rotary speed of wheels 72 or 78, for example, and/or may be optionally selected by an operator. In this regard, vehicle V3 may be provided with a mode selection means for the optional selection of driving modes, e.g., a switch, a dial, a button a lever or a pedal. FIG. 6 illustrates a lever 105 serving as the mode selection means.

Figure 7:
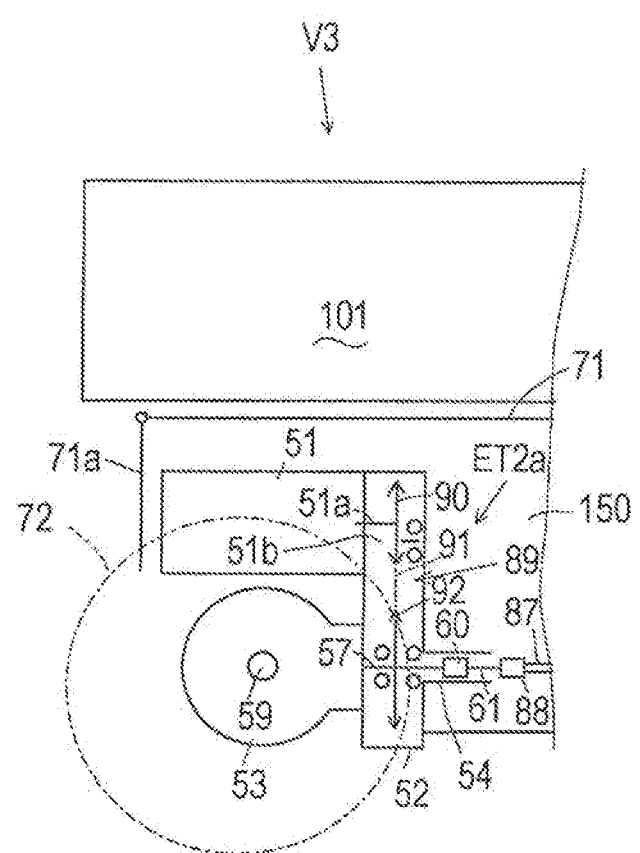
FIG. 7 is a fragmentary schematic side view of vehicle V3 equipped with an electric transaxle ET2a serving as a modification of electric transaxle ET2.

Referring to FIG. 7, an electric transaxle ET2a is a modification of electric transaxle ET2. A chain transmission 89 is disposed in reduction gear casing 52 so as to replace reduction gear train RG2 in reduction gear casing 52 of electric transaxle ET2. Chain transmission 89 includes a sprocket 90 provided on motor output shaft 51a, a sprocket 92 provided on reduction output shaft 57, and a chain 91 interposed between sprockets 90 and 92. FIG. 7 shows electric transaxle ET2a used in hybrid vehicle V3. In FIG. 7, the same reference numerals as those used for electric transaxle ET2 shown in FIG. 4 and vehicle V3 shown in FIG. 6 are used to designate the same components as those of electric transaxle ET2 and vehicle V3. Alternatively, electric transaxle ET2a may be used in electric vehicle V2.

Alternatively, chain transmission 89 may be replaced with a belt transmission or a transmission of another type. Incidentally, reduction gear train RG1 in electric transaxle ET1 shown in FIGS. 1 and 2 may be replaced with a chain transmission, a belt transmission or a transmission of another type.

Figure 8:
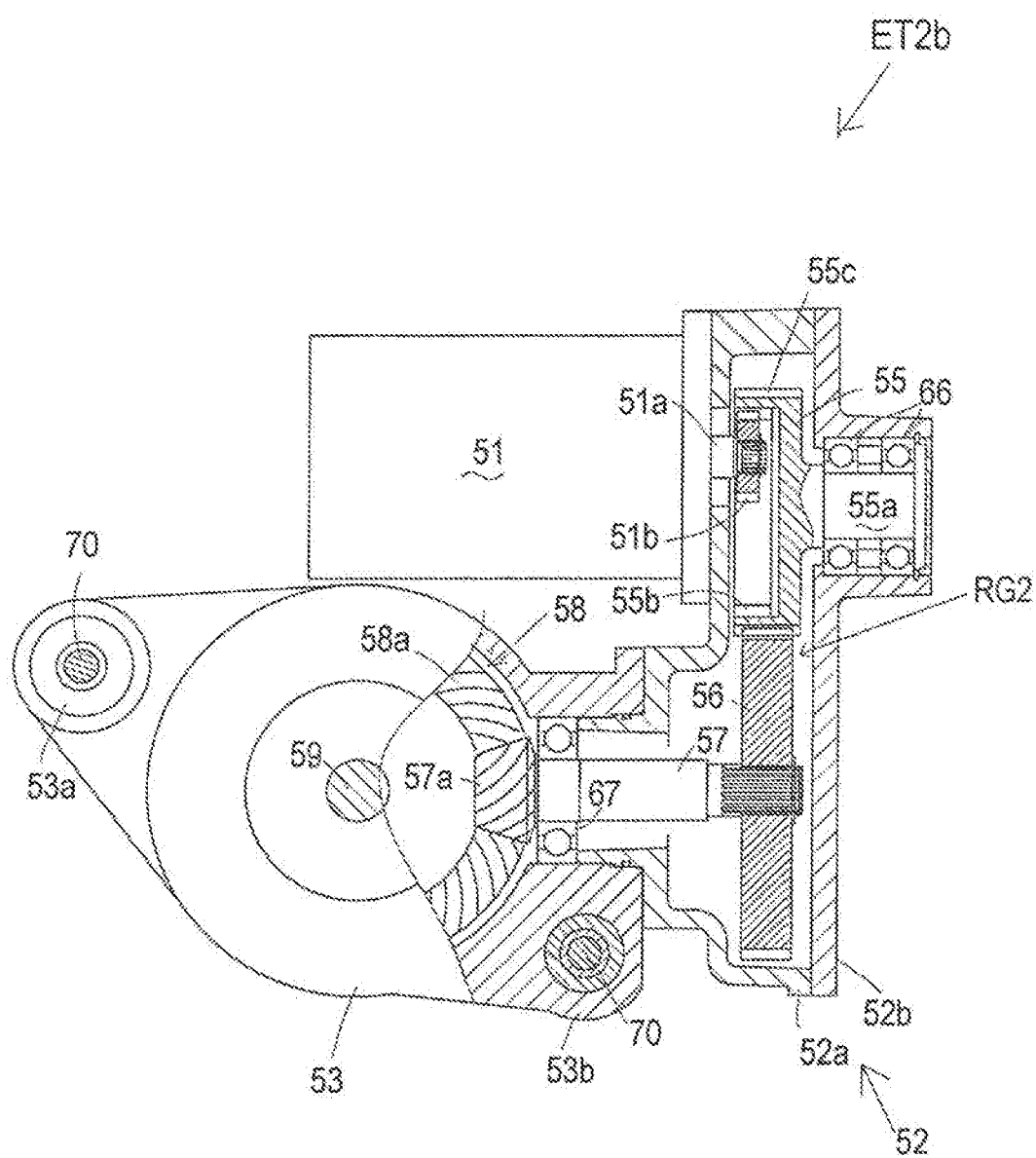
FIG. 8 is a side view partly in section of an electric transaxle ET2b serving as another modification of electric transaxle ET2.

Referring to FIG. 8, an electric transaxle ET2b is an alternative modification of electric transaxle ET2. Electric transaxle ET2b corresponds to electric transaxle ET2 without PTO casing 54 and interior components of PTO casing 54, such as PTO clutch 60 and PTO shaft 61. In this regard, in electric transaxle ET2b, an axial end of reduction output shaft 57 opposite to bevel pinion 57a is disposed in reduction gear casing 52, and cover 52b covers this end of reduction output shaft 52. ET2b having no PTO shaft 61 is available as a transaxle for driving only its own axles 59, which is not assumed to drive another axle. In FIG. 8, the same reference numerals as those used for electric transaxle ET2 shown in FIG. 4 are used to designate the same components as those of electric transaxle ET2.

Electric transaxle ET2b includes reduction gear train RG2, similar to electric transaxle ET2. Alternatively, electric transaxle ET2b may be provided with a chain transmission replacing reduction gear train RG2, similar to electric transaxle ET2a. Alternatively, electric transaxle ET2b may be provided with a belt transmission or another transmission for transmitting power of electric motor 51 to differential gear unit 58.

Figure 9:
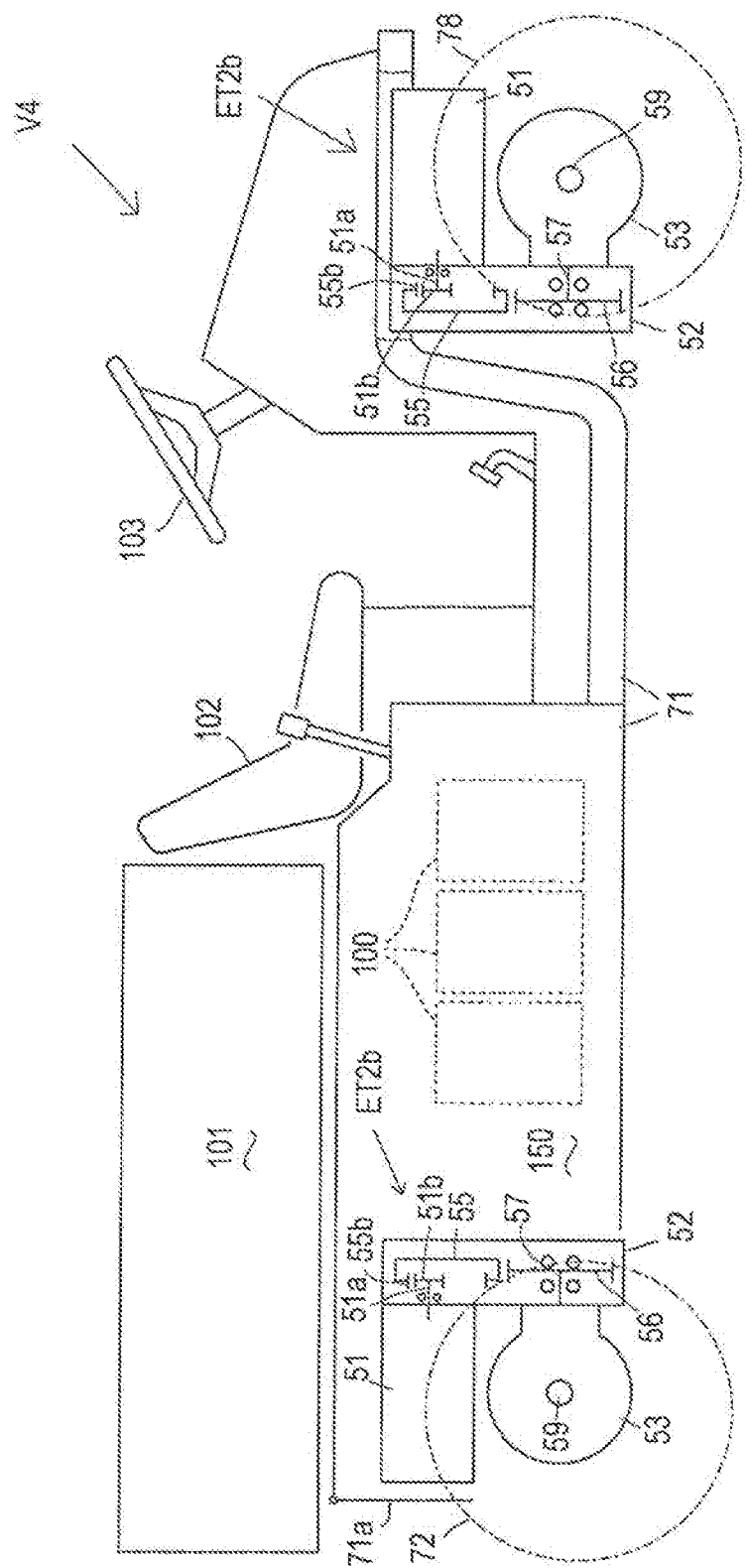
FIG. 9 is a schematic side view pf an electric utility vehicle V4 equipped with electric transaxles ET2b serving as front and rear transaxles.

Referring to FIG. 9, an electric utility vehicle (hereinafter, simply referred to as "vehicle") V4 is equipped with two electric transaxles ET2b serving as front and rear transaxles. One electric transaxle ET2b is supported by a rear portion of vehicle body frame 71 so as to serve as the rear transaxle having right and left axles 59 on which right and left rear wheels 72 are provided. The other electric transaxle ET2b is supported by a front portion of vehicle body frame 71 so as to serve as the front transaxle having right and left axles 59 on which right and left front wheels 78 are provided. Therefore, rear wheels 72 and front wheels 78 are driven by independent electric motors 51, i.e., rear wheels 72 are driven by electric power of electric motor 51 of rear electric transaxle ET2b, and front wheels 78 are driven by electric power of electric motor 51 of front electric transaxle ET2b. Further, vehicle V4 is equipped with at least one battery 100 for reserving electric power to be supplied to electric motors 51 of front and rear electric transaxles ET2b.

Vehicle V4 is driven in either 4WD mode or 2WD mode by only electric power, similar to vehicle V2. However, the 4WD/2WD mode selection of vehicle V4 depends on selection whether to drive both or one of electric motors 51 of front and rear electric transaxles ET2b, in comparison with the 4WD/2WD mode selection of vehicle V2 that depends on shift of clutch 60 for selecting whether or not the power of electric motor 51 of electric transaxle ET2 serving as the rear transaxle is transmitted to front transaxle casing 75. Further, vehicle V4 can travel in 2WD mode by driving either rear wheels 72 or front wheels 78 depending on whether rear electric transaxle ET2b or front electric transaxle ET2b is selected to drive its own electric motor 51, in comparison with the 2WD mode traveling of vehicle V2 that depends only on driving of rear wheels 72 because front wheels 78 cannot receive power of electric motor 51 of electric transaxle ET2 when clutch 60 is clutched off.

Therefore, in comparison with vehicle V2 that needs at least one propeller shaft 74 and universal joints 73 for transmitting power from electric transaxle ET2 having rear axles 59 to front axles 77, vehicle V4 is advantageous in needing no component for transmitting power from one electric transaxle ET2b to axles 59 of another electric transaxle ET2b, thereby expanding a free space between front and rear transaxles ET2b, and thereby eliminating noise that is caused by driving propeller shaft 74.

Incidentally, in illustrated vehicle V4, front and rear transaxles ET2b are arranged so as to be symmetrical in the fore-and-aft direction of vehicle V4, i.e., one transaxle ET2b corresponds to the other transaxle ET2b reversed in the fore-and-aft direction of vehicle V4. More specifically, front transaxle ET2b is disposed so as to have electric motor 51 and differential gear casing 53 extended forward from reduction gear casing 52, and rear transaxle ET2b is disposed so as to have electric motor 51 and differential gear casing 53 extended rearward from reduction gear casing 52. However, it is not limiting for each of front and rear transaxles ET2b whether to extend electric motor 51 and differential gear casing 53 forward from reduction gear casing 52 or rearward from reduction gear casing 52.

Figure 10:
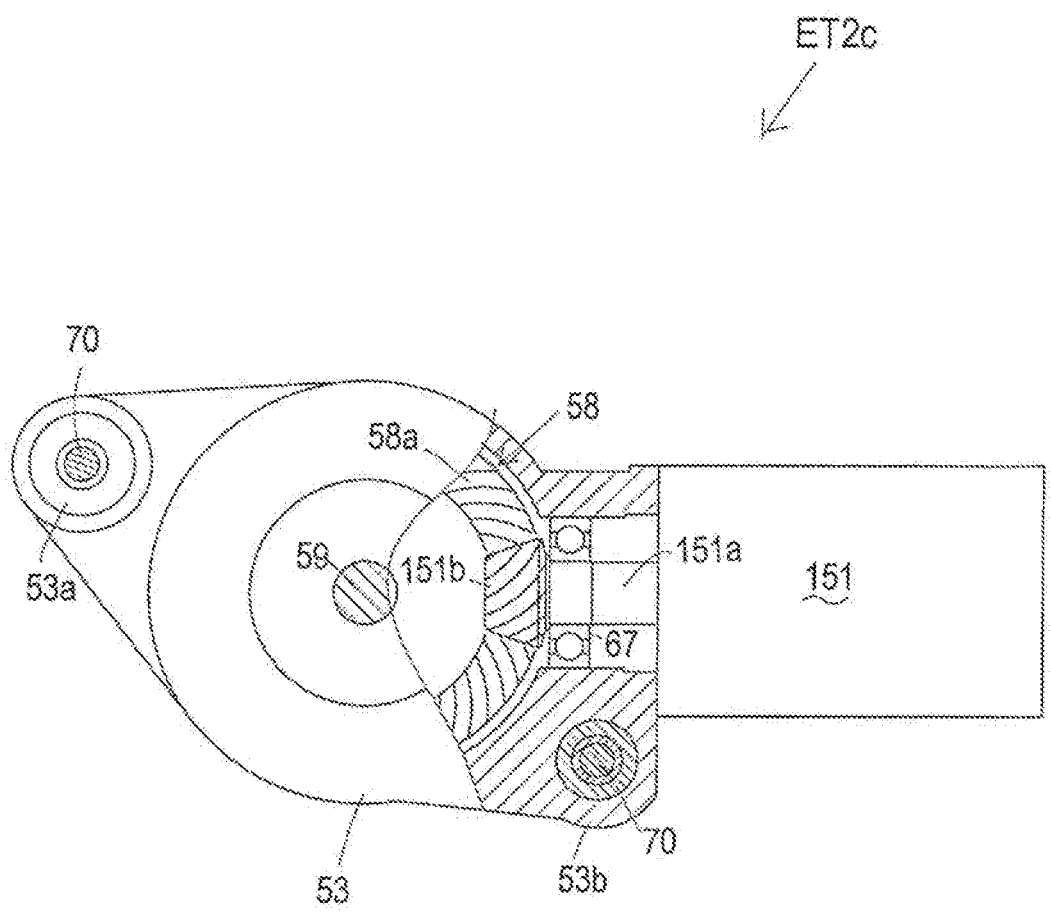
FIG. 10 is a side view partly in section of an electric transaxle ET2c serving as a modification of electric transaxle ET2b.

Referring to FIG. 10, an electric transaxle ET2c is a modification of electric transaxle ET2b. Electric transaxle ET2c corresponds to electric transaxle ET2b without reduction gear casing 52 and interior components of reduction gear casing 52, such as reduction gear train RG2. In this regard, in electric transaxle ET2c, an electric motor 151 is directly attached to differential gear casing 53. Electric motor 151 has a motor output shaft 151a, and a bevel pinion 151b is formed on a tip portion of motor output shaft 151a. By attaching electric motor 151 to differential gear casing 53, motor output shaft 151 is inserted into differential gear casing 53 so as to serve as reduction output shaft 57 of electric transaxle ET2b, and bevel pinion 151b meshes with bevel input gear 58*a* of differential gear unit 58 in differential gear casing 53 so as to serve as bevel pinion 57*a* of electric transaxle ET2*b*.

Electric transaxle ET2*c* is advantageous in its compactness and in its efficiency of power transmission to axles 59, in comparison with electric transaxle ET2*b* having reduction gear casing 52 and reduction gear train RG2.

In vehicle V4 as shown in FIG. 9, at least one of front and rear electric transaxles ET2*b* may be replaced with alternative electric transaxle ET2*c*. Further, electric transaxle ET2*c* may be modified to have a PTO shaft, thereby being able to serve as electric transaxle ET2 in electric vehicle V2 or electric transaxle ET2 in hybrid vehicle V3.

Figure 11:
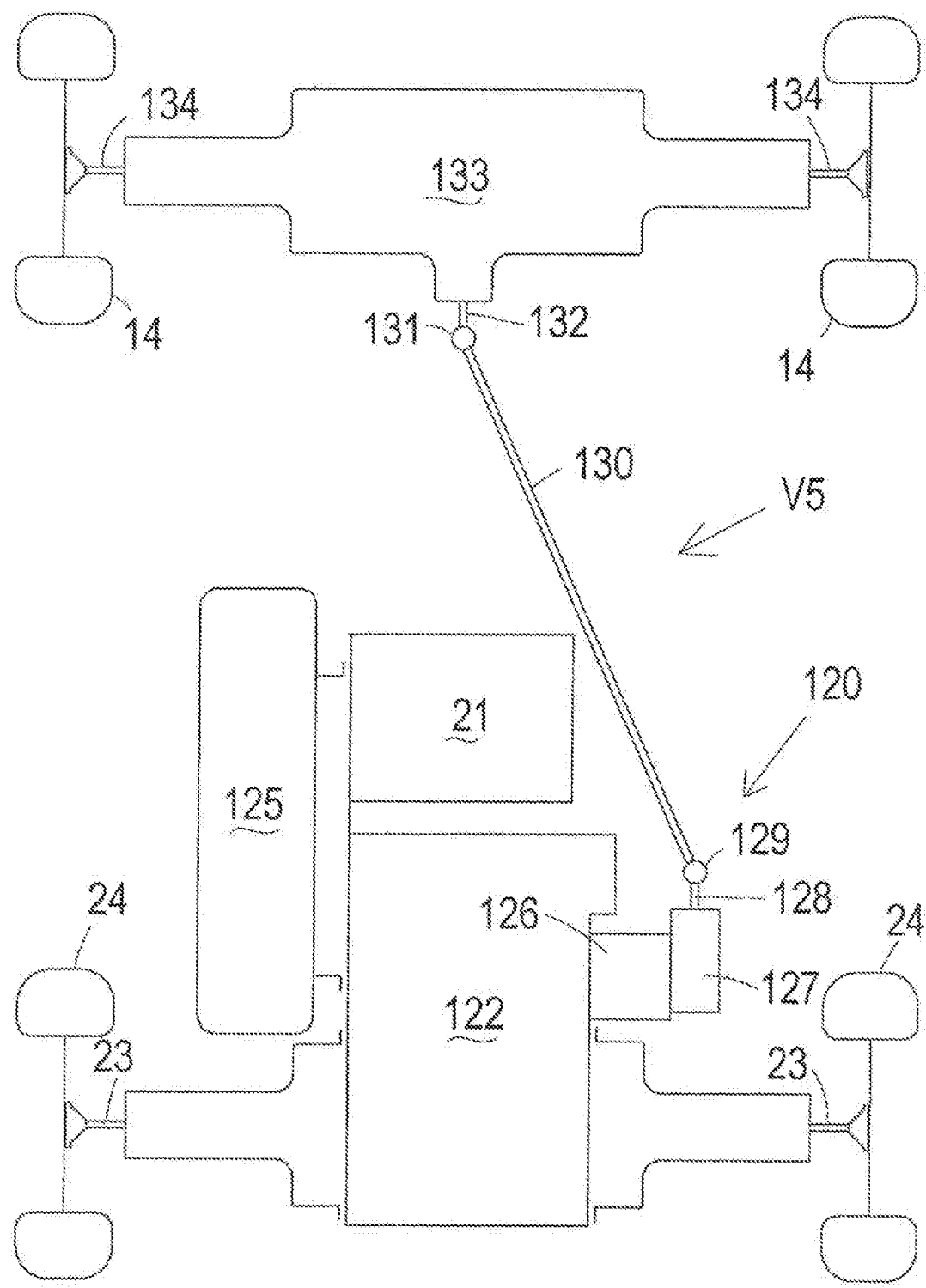
FIG. 11 is a schematic plan view of a vehicle V5 that is equipped with an engine-transmission assembly 120 carrying rear wheels 24 and that is equipped with a front transaxle 133 carrying front wheels 14, wherein the front transaxle 133 is driven by power taken off from engine-transmission assembly 120, and wherein engine-transmission assembly 120 includes a motor generator.

Referring to FIG. 11, four-wheel drive vehicle V5, e.g., a utility vehicle, is equipped with an engine-transmission assembly 120 carrying right and left rear wheels 24. Vehicle V5 is also equipped with a front transaxle 133 carrying right and left front wheels 14. Engine-transmission assembly 120 includes a PTO shaft 128 from which power is taken off to drive front transaxle 133.

Engine-transmission assembly 120 is a combination of engine 21 and a transmission assembly, and the transmission assembly includes a transaxle casing 122 and a belt transmission casing 125. Transaxle casing 122 incorporates a gear transmission. Belt transmission casing 125 is interposed between engine 21 and transaxle casing 122. Transaxle casing 122 supports right and left axles 23. Right and left rear wheels 24 are provided on distal ends of respective right and left axles 23.

Engine 21 and transaxle casing 122 are juxtaposed in the fore-and-aft or vertical direction of vehicle V5. Belt transmission casing 125 is disposed on either right or left side (in this embodiment, left side) of engine 21 and gear transmission 122. A PTO casing 127 is attached via a motor generator casing 126 onto the other left or right side (in this embodiment, right side) of transaxle casing 122 opposite to belt transmission casing 125 in the lateral direction of vehicle V5. PTO shaft 128 projects forward from PTO casing 125. Front transaxle 133 includes a rearwardly projecting input shaft 132 that is drivingly connected to PTO shaft 128 via a propeller shaft 130 with universal joints 129 and 131. Front transaxle 133 incorporates a differential unit (not shown) differentially connecting right and left axles 134. This differential unit transmits the rotary power of input shaft 132 inputted from PTO shaft 128 to right and left axles 134.

Figure 12:
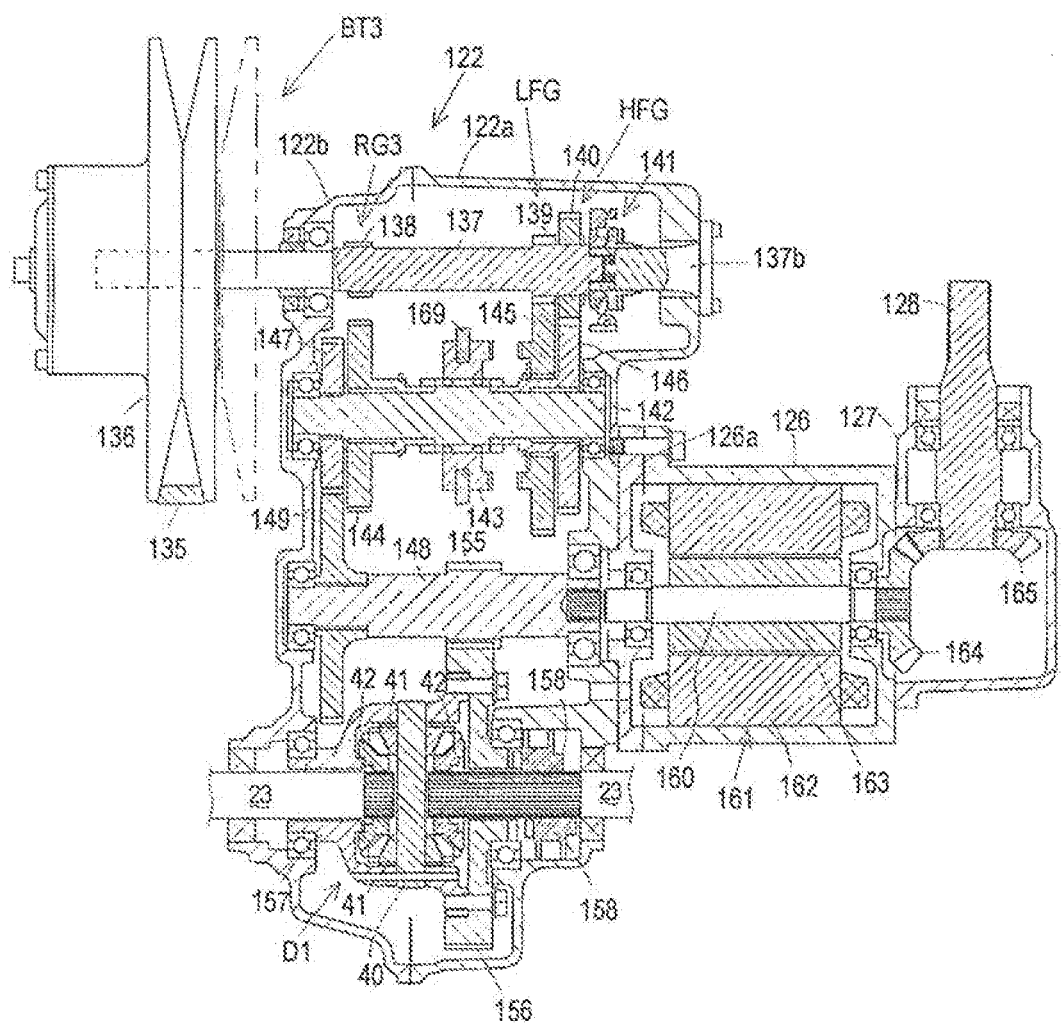
FIG. 12 is a developed sectional view of engine-transmission assembly 120.

Referring to FIGS. 12 to 15, an interior structure of transaxle casing 122 will be described. As shown in FIG. 12, transaxle casing 122 includes left and right divisional casing parts 122*a* and 122*b* joined to each other via a vertical joint plane. Laterally horizontal gear shafts 137, 142 and 148 and right and left coaxial axles 23 are extended parallel to each other in transaxle casing 122. A right or left end (in this embodiment, left end) of gear input shaft 137 projects from transaxle casing 122 and into belt transmission casing 125 (not shown in FIG. 12) so as to serve as a pulley shaft of a driven pulley 136. In belt transmission casing 125, driven pulley 136 is drivingly connected to a drive pulley (not shown) configured on an engine output shaft of engine 21, whereby the drive pulley, driven pulley 136 and belt 135 constitute a belt transmission BT3.

Figure 13:
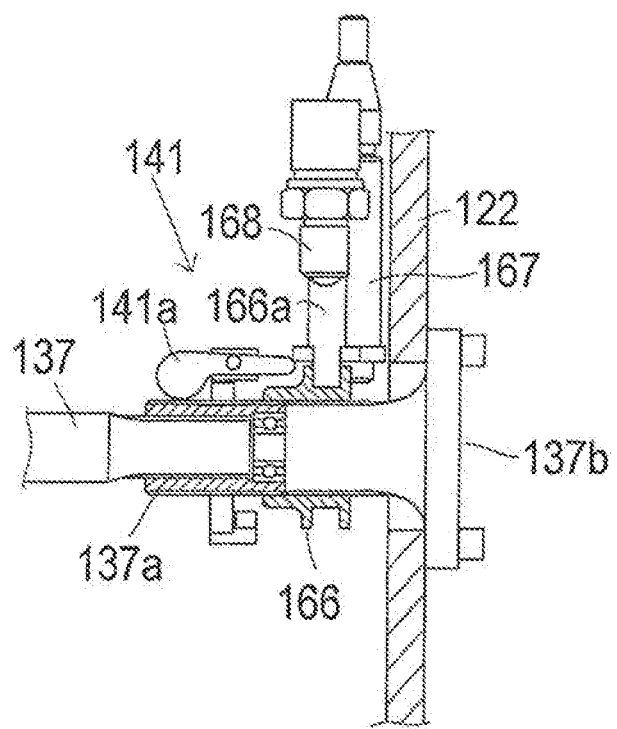
FIG. 13 is a sectional view of a governor 141 set at a parking-on position in engine-transmission assembly 120 when engine 21 is stationary.
Figure 14:
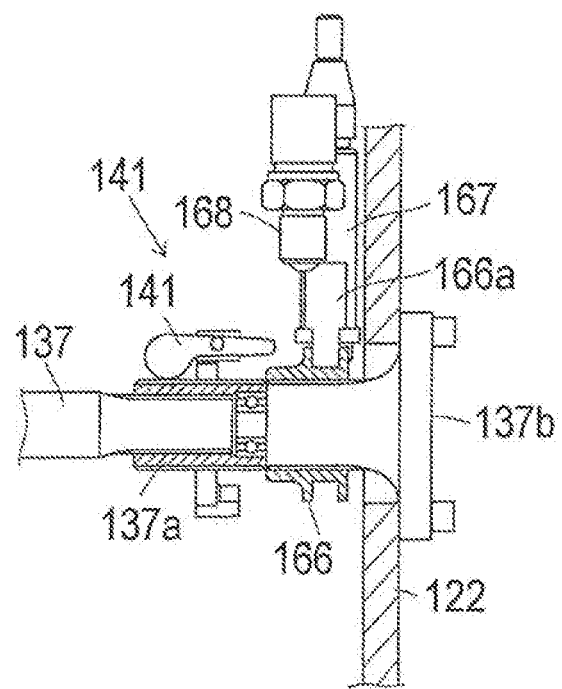
FIG. 14 is a sectional view of governor 141 set at a parking-off position.
Figure 15:
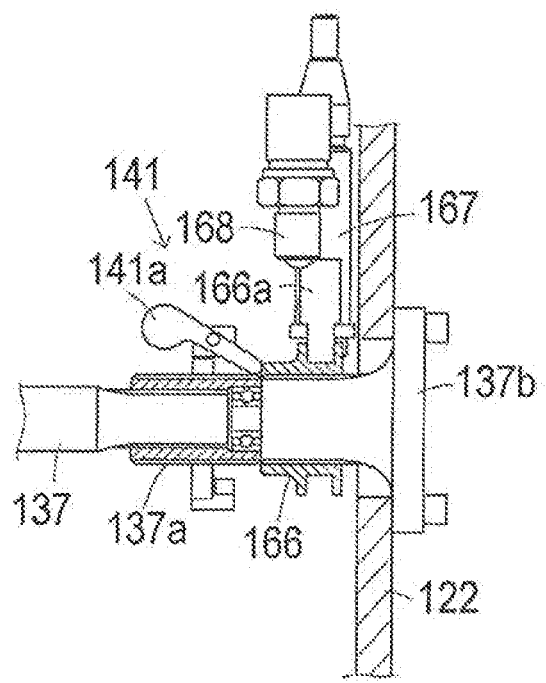
FIG. 15 is a sectional view of governor 141 set at parking-off position when engine 21 is driven.

As shown in FIGS. 13, 14 and 15, a spline collar 137*a* is provided in transaxle casing 122. Spline collar 137*a* has a hole that is splined on an inner peripheral surface thereof, and an axial end portion of gear input shaft 137 opposite to belt transmission casing 125 is spline-fitted into this hole of spline collar 137*a*. Spline collar 137*a* is also splined on an outer peripheral surface thereof so that a parking shifter 166 can be spline-fitted on the splined outer peripheral surface of spline collar 137*a*. A governor weight 141*a* of a centrifugal governor 141 is provided on an outer peripheral portion of spline collar 137*a*.

As shown in FIGS. 13, 14 and 15, in transaxle casing 122, a fixture shaft 137*b* is extended coaxially to gear input shaft 137 laterally opposite to belt transmission casing 125. An axial projection is formed on one axial end of fixture shaft 137*b* and is inserted into spline collar 137*a* via a bearing. Therefore, spline collar 137*a* is fitted at one axial end thereof on gear input shaft 137 rotatably integrally with gear input shaft 137, and is fitted at the other axial end thereof on fixture shaft 137*b* rotatably relative to fixture shaft 137*b*. Fixture shaft 137*b* projects at the other axial end thereof outward from transaxle casing 122 via a hole of transaxle casing 122. A flange is formed on this axial end of fixture shaft 137*b* disposed outside of transaxle casing 122 laterally opposite to belt transmission casing 125 and is fastened to transaxle casing 122 (right divisional casing part 122*b*) via bolts.

As shown in FIGS. 13, 14 and 15, in transaxle casing 122, a parking shifter 166 is spline-fitted on an outer peripheral surface of fixture shaft 137*b* so that parking shifter 166 is axially slidable on fixture shaft 137*b* and is unrotatable relative to fixture shaft 137*b*, i.e., the rotational position of parking shifter 166 is fixed to transaxle casing 122 via fixture shaft 137*b*. Due to the axial slide of parking shifter 166, it is selected whether or not parking shifter 166 is spline-fitted on the splined outer peripheral surface of spline collar 137*a*.

As shown in FIG. 12, a reverse drive gear 138, a low-speed drive gear 139 and a high-speed drive gear 140 are fixed or formed on gear input shaft 137. A reverse driven gear 144 and a high-speed driven gear 146 are fitted on first counter shaft 142 so as to be rotatable relative to first counter shaft 142. A low-speed driven gear 145 is fitted on a central boss portion of high-speed driven gear 146 so as to be rotatable relative to high-speed driven gear 146. Reverse drive gear 138 and reverse driven gear 144 mesh with each other via an idle gear (not shown) so that gears 138 and 144 and the idle gear constitute a backward traveling gear train RG3. Low-speed drive gear 139 and low-speed driven gear 145 directly mesh with each other so as to constitute a low-speed forward traveling gear train LFG. High-speed drive gear 140 and high-speed driven gear 146 directly mesh with each other so as to constitute a high-speed forward traveling gear train HFG.

A shifter 143 is spline-fitted on an axial intermediate portion of first counter shaft 142 between a central boss portion of backward traveling driven gear 144 and the central boss portion of high-speed forward traveling driven gear 146 so as to be unrotatable relative to first counter shaft 142 and so as to be axially slidable on first counter shaft 142. FIG. 12 shows shifter 143 set at a neutral position where shifter 143 meshes with none of driven gears 144, 145 and 146. Shifter 143 is able to slide in one direction (leftward in FIG. 12) from the neutral position so as to be set at a backward traveling position where shifter 143 meshes with the central boss portion of reverse driven gear 144. Shifter 143 is able to slide in the other direction (rightward in FIG. 12) from the neutral position so as to be set at a high-speed forward traveling position (a normal forward traveling position) where shifter 143 meshes with the central boss portion of high-speed driven gear 146. Shifter 143 is able to slide further in the other direction (further rightward in FIG. 12) from the high-speed forward traveling position so as to be set at a low-speed forward traveling position (a working forward traveling position) where shifter 143 meshes with low-speed driven gear 145. In other words, when shifter 143 is set at one of the backward traveling position, the low-speed forward traveling position and the high-speed forward traveling position, shifter 143 fixes corresponding driven gear 144, 145 or 146 to first counter shaft 142 so as to transmit the rotary power of gear input shaft 137 to first counter shaft 143 via the corresponding one of gear trains RG3, HFG and LFG A gear 147 is fixed on first counter shaft 142, a gear 149 is fixed on second counter shaft 148, and gears 147 and 149 mesh with each other so as to transmit power from first counter shaft 142 to second counter shaft 148. A gear 155 is fixed or formed on second counter shaft 148. A differential gear unit D1 is disposed in transaxle casing 122 so as to differentially connect right and left axles 23 to each other. Gear 155 meshes with a differential input gear (bull gear) 156 of differential gear unit D1 so as to transmit power from second counter shaft 148 to differential gear unit D1.

Differential gear unit D1 is similar to differential unit D in transaxle casing 22 of engine-transmission assembly 20 shown in FIG. 3, except that differential input gear 156 has a central boss fitted on one (right) axle 23, a differential casing 157 is fixed to differential input gear 156 and has a central boss fitted on the other (left) axle 23, and a differential lock clutch 158 is spline-fitted on the one (right) axle 23 so as to be able to mesh with the central boss of differential input gear 156. The fitting of the central bosses of differential input gear 156 and differential casing 157 onto respective axles 23 transmits rotation of differential input gear 156 and differential casing 157 to axles 23, however, allows differential rotation of right and left axles 23 as far as differential lock clutch 158 is set at a differential unlock position to disengage from the central boss of differential input gear 156. When differential lock clutch 158 is set at a differential lock position to mesh with the central boss of differential input gear 156, differential input gear 156 and differential casing 157 are locked to (right) axle 23 on which differential lock clutch 158 is spline-fitted, thereby locking right and left axles 23 to each other. Incidentally, for convenience of understanding, an upper part of differential lock clutch 158 above axle 23 in FIG. 12 is drawn as being located at the differential lock position and a lower part of differential lock clutch 158 below axle 23 in FIG. 12 is drawn as being located at the differential unlock position.

Referring to FIG. 12, interior structures of motor generator casing 126 and PTO casing 127 will be described. Motor generator casing 126 is fixed to one (right) side portion of transaxle casing 122 laterally opposite to belt transmission casing 125 so as to avoid interfering with belt transmission casing 125. A rotor shaft 160 is journalled in motor generator casing 126 and is extended coaxially to second counter shaft 148 in transaxle casing 122. One axial end portion of rotor shaft 160 projects from motor generator casing 126 into transaxle casing 122 and is connected (spline-fitted) to second counter shaft 148 so as to be rotatably integral with second counter shaft 148.

PTO casing 127 is fixed on one (right) side of motor generator casing 126 laterally opposite to transaxle casing 122. The other axial end portion of rotor shaft 160 projects from motor generator casing 126 into PTO casing 127 and is fixedly provided thereon with a bevel gear 164. PTO shaft 128 is journalled in PTO casing 127 and is fixedly provided on an end portion thereof with a bevel gear 165. Bevel gears 164 and 165 mesh with each other so as to transmit power from second counter shaft 148 to PTO shaft 128 via rotor shaft 160.

In motor generator casing 126, a rotor 163 having a magnet is fixed on rotor shaft 160. A stator 162 having an armature is fixed on an inner peripheral surface of motor generator casing 126 and is disposed to surround rotor 163. In this way, stator 162 and rotor 163 constitute motor generator 161. When electric power is supplied from a battery (not shown) to the armature of stator 163, motor generator 161 functions as an electric motor so as to drive rotor shaft 160. This driving of rotor shaft 160 by the motor function of motor generator 161 drives axles 23 and PTO shaft 128 without power of engine 21 or assists second counter shaft 148 driven by power of engine 21 via belt transmission BT3 to drive axles 23 and PTO shaft 128. When electric power is not supplied to the armature of stator 162 and engine 21 outputs power to drive axles 23 and PTO shaft 128, rotor shaft 160 and rotor 161 rotate together with second counter shaft 148 so as to make the armature of stator 162 generate an electricity, whereby motor generator 161 functions as a generator.

When motor generator 161 functions as the generator, motor generator 161 also functions as a regenerative brake. In this regard, engine-transmission assembly 120 has belt transmission BT3 that is a continuously variable transmission (CVT) lacking the function of engine braking. The regenerative braking function of motor generator 161 compensates for the lack of engine braking function. Therefore, engine-transmission assembly 120, even having the CVT, is advantageous in having an effective brake comparable to an engine brake of an ordinary car having a gearshift transmission.

Incidentally, any one of shafts 137, 142 and 148 in transaxle casing 122 may be used to be joined to rotor shaft 160 if it is available to transmit power to PTO shaft 128 and to ensure the configuration of motor generator 161 in motor generator casing 126 attached to transaxle casing 122.

Operation of parking shifter 166 and governor weight 141a disposed in transaxle casing 122 as mentioned above will now be described with reference to FIGS. 13, 14 and 15. Parking shifter 166 is operatively connected to a parking shift arm 167 via a fork 166a. Parking shift arm 167 is operatively connected to a parking manipulator (not shown) provided in vehicle V5. Parking shifter 166 is shiftable between a parking-on position shown in FIG. 13 and a parking-off position shown in FIG. 14 according to manipulation of the parking manipulator. Parking shifter 166 set at the parking-on position is extended and spline-fitted onto the outer peripheral surface of spline collar 137a so as to lock gear input shaft 137 and spline collar 137a to fixture shaft 137b. Parking shifter 166 set at the parking-off position is not extended onto the outer peripheral surface of spline collar 137a, thereby allowing gear input shaft 137 and spline collar 137a to rotate relative to fixture shaft 137b.

During the setting of parking shifter 166 at the parking-off position, as the rotary speed of gear input shaft 137 increases by driving engine 21, governor weight 141a of centrifugal governor 141 rotates and finally contacts an axial end of parking shifter 166 at the parking-off position as shown in FIG. 15, thereby preventing parking shifter 166 from unexpectedly moving toward the parking-on position, and thereby preventing gear input shaft 137 from being unexpectedly locked to fixture shaft 137b (i.e., to transaxle casing 122) during traveling of vehicle V5.

Incidentally, a sensor 168 shown in FIGS. 13, 14 and 15 detects whether or not parking shifter 166 or fork 166a is disposed at the parking-on position. A warning light is lighted on an indicator or an alarm is sounded in vehicle V5 according to a detection signal from sensor 168.

Figure 19:
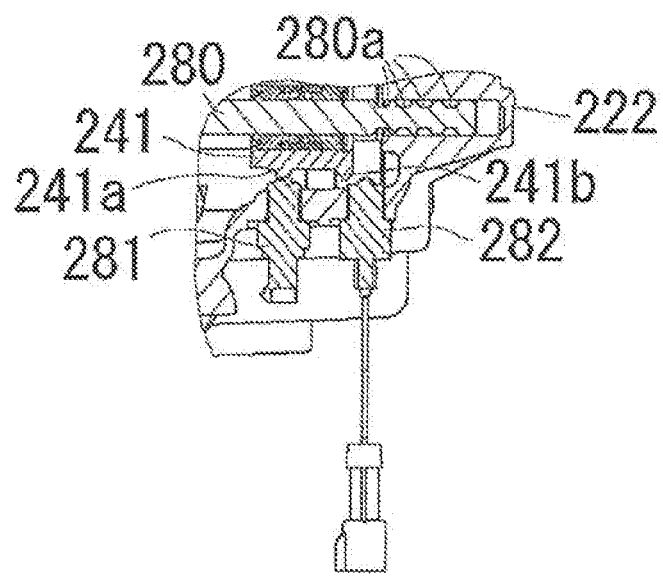
FIG. 19 is a fragmentary sectional view of central engine-transmission assembly 220 showing sensors 281 and 282 for detecting a position of fork 241.
Figure 20:
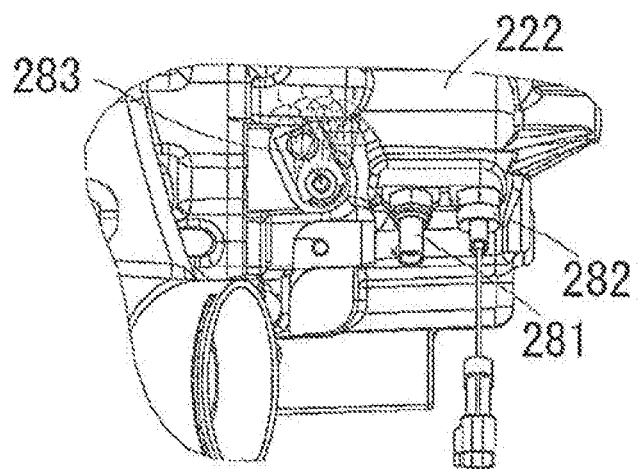
FIG. 20 is a fragmentary external view of central engine-transmission assembly 220 showing sensors 281 and 282.

Similarly, transaxle casing 122 is provided therein with sensors (not shown) for detecting a position of shifter 143, more strictly, for detecting a position of a fork 169 fitted on shifter 143. Fork 169 is mounted on a fork shaft (not shown) disposed in transaxle casing 122 parallel to first counter shaft 142 so as to be axially slidably integral with the fork shaft 170, thereby enabling shifter 143 to axially slide on first counter shaft 142 along with the axial movement of the fork shaft. One of the sensors detects an axial slide position of the fork corresponding to the backward traveling position of shifter 143, and another of the sensors detects another axial slide position of the fork corresponding to the neutral position of shifter 143, thereby alarming an operator of real arrival of shifter 143 at the backward traveling position or the neutral position. A detailed description of these sensors of engine-transmission assembly 120 in structure and in purpose relies on description of sensors 281 and 282 as shown in FIGS. 19 and 20, which are provided in a later-discussed engine-transmission assembly 220 for the same purpose.

Figure 16:
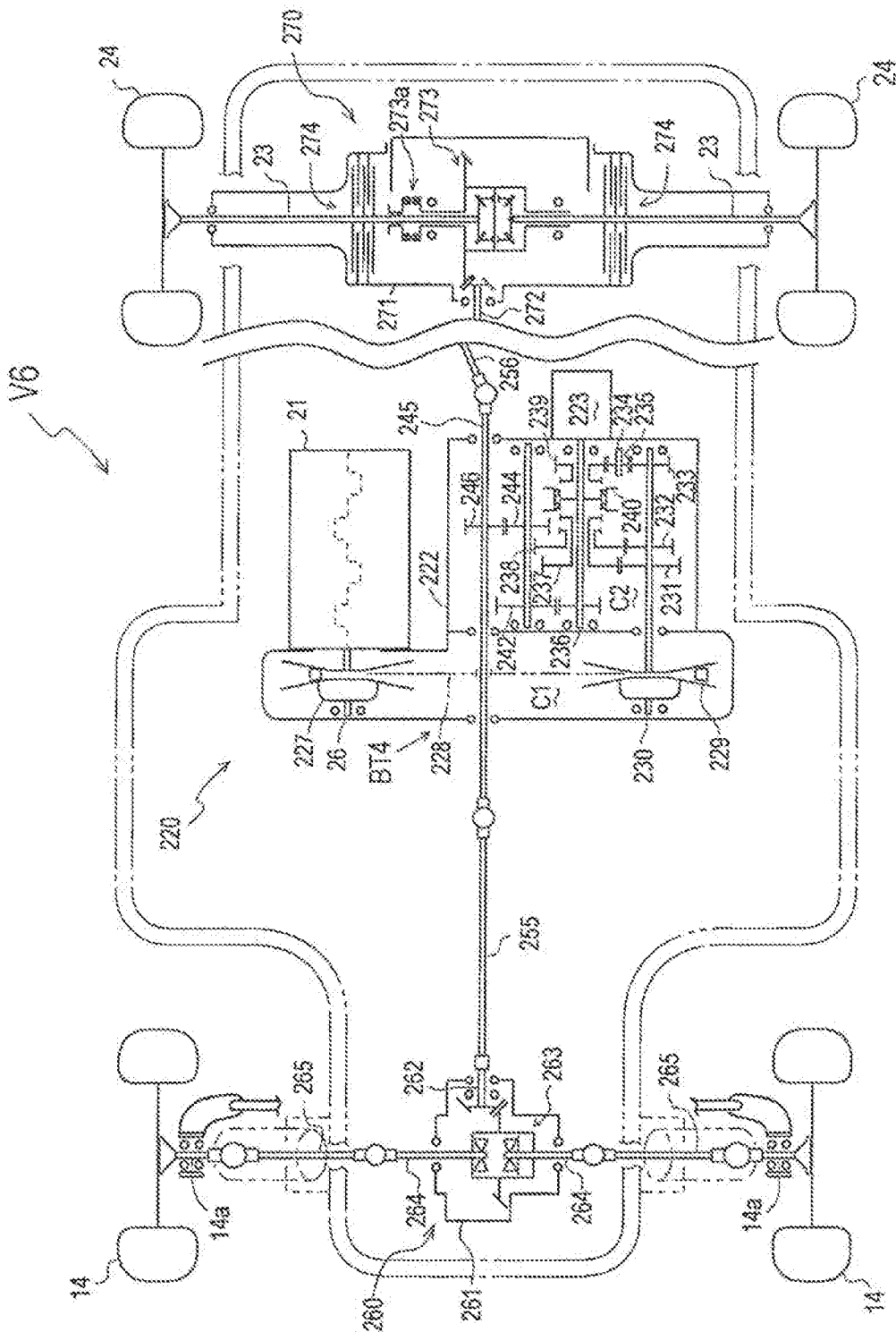
FIG. 16 is a skeleton diagram of a vehicle V6 that is equipped with a central engine-transmission assembly 220 and front and rear transaxles driven by power outputted from central engine-transmission assembly 220, wherein central engine-transmission assembly 220 includes a motor generator.

FIG. 16 shows a four-wheel drive vehicle V6 equipped with an alternative engine-transmission assembly 220 including a continuously variable belt transmission (CVT) BT4 and a motor generator 251. This engine-transmission assembly 220 also has the advantage in that motor generator 251 functions as the regenerative brake compensating for the lack of engine brake function of belt transmission BT4. In vehicle V6, central engine-transmission assembly 220 distributes output power between a front transaxle 260 carrying front wheels 14 and a rear transaxle 270 carrying rear wheels 24. In this regard, engine-transmission assembly 220 has an output shaft 245 projecting forward and rearward at front and rear ends thereof. The front end of output shaft 245 is drivingly connected to an input shaft 262 of front transaxle 260 via a propeller shaft 255 with a universal joint or/and the like. The rear end of output shaft 245 is drivingly connected to an input shaft 272 of rear transaxle 270 via a propeller shaft 256 with a universal joint or/and the like.

A differential unit 263 is disposed in a transaxle casing 261 of front transaxle 260, and a differential unit 273 is disposed in a transaxle casing 271 of rear transaxle 270. In this embodiment, rear wheel differential unit 273 is drawn as an ordinary differential gear mechanism, and front wheel differential unit 263 is drawn as a bi-directive clutch. These are only examples. Each differential unit may have any structure. Further, rear differential unit 273 is provided with a differential locking mechanism 273*a*, which may be provided as needed.

Front wheel differential unit 263 is drivingly connected to axles 14*a* of right and left front wheels 14 via respective propeller shafts 263 with universal joints. Alternatively, differential unit 263 may differentially connect axles 14*a* of right and left front wheels 14 without propeller shafts 265 having universal joints. On the other hand, rear wheel differential unit 273 differentially connects axles 23 of right and left rear wheels 24 to each other. Alternatively, propeller shafts with universal joints such as propeller shafts 265 may be interposed between respective differential yoke shafts of differential unit 273 and respective axles 23. Right and left brakes 274 are provided on respective right and left axles 23 in transaxle casing 271. Alternatively, a brake for braking output shaft 245 may be provided in engine-transmission assembly 220.

Figure 17:
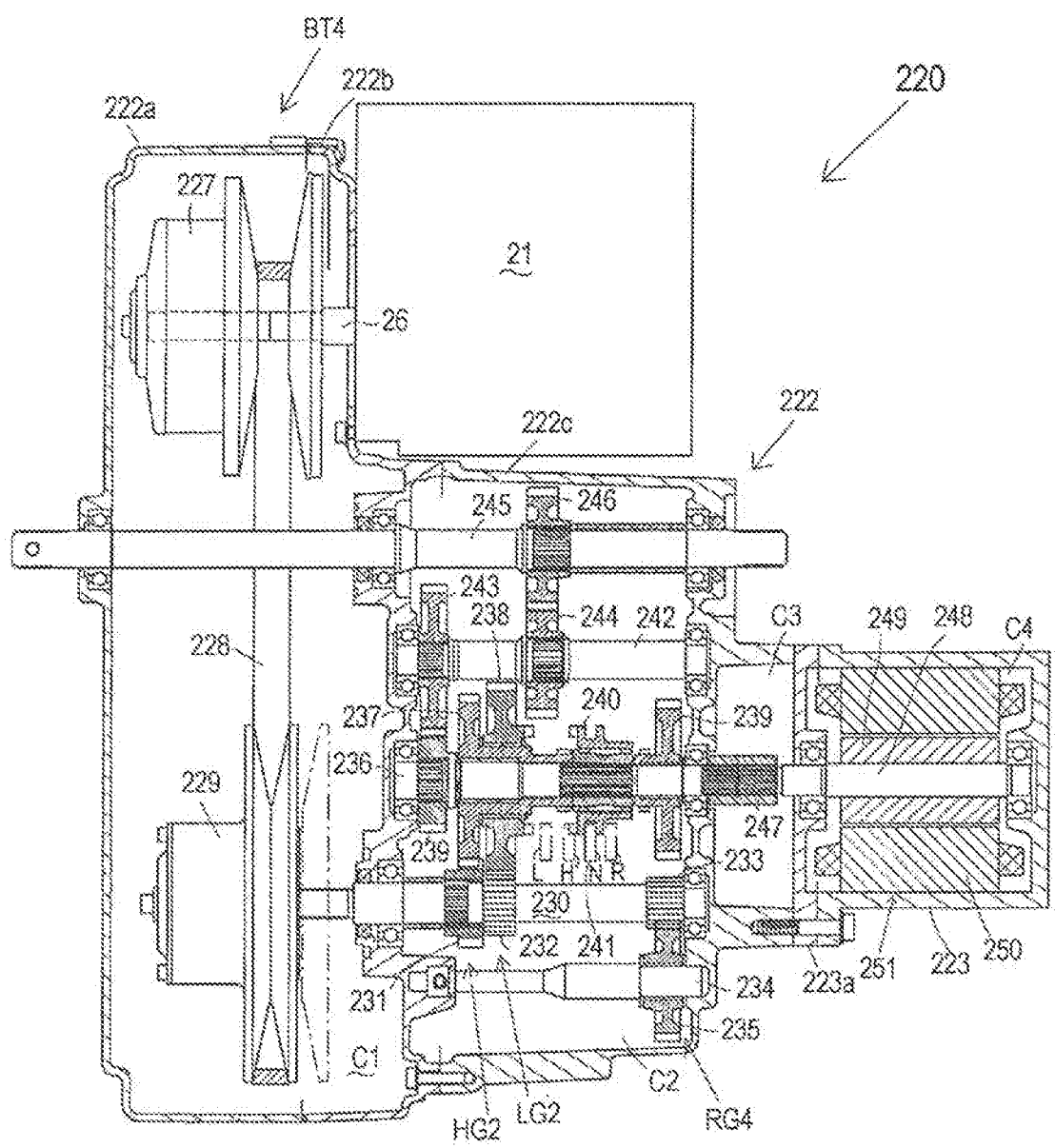
FIG. 17 is a developed sectional view of central engine-transmission assembly 220.

Referring to FIG. 17, engine-transmission assembly 220 will be described on an assumption that engine-transmission assembly 220 is arranged to have belt transmission BT4 forward of engine 21. Engine-transmission assembly 220 is a combination of engine 21 and a transmission assembly, and this transmission assembly includes a transmission casing 222. Transmission casing 222 includes a front housing 222*a*, a middle housing 222*b* and a rear housing 222*c*. An open front end of middle housing 222*b* is joined to an open rear end of front housing 222*a*, and an open rear end of middle housing 222*b* is joined to an open front end of rear housing 222*c*, thereby constituting transmission casing 222. A partition wall is formed in middle housing 222*b* between the open front and rear ends of middle housing 222*b* so as to divide an inner space of middle housing 222*b* into front and rear spaces. An inner space in front housing 222*a* and the front space in middle housing 222*b* joined to front housing 222*a* are defined as a belt transmission chamber C1 forward of the partition wall. An inner space in rear housing 222*c* and the rear space in middle housing 222*b* joined to rear housing 222*c* are defined as a gear transmission chamber C2 rearward of the partition wall.

Middle housing 222*b* is extended to have a vertical face, and a front end of engine 21 is fixed to this vertical face of middle housing 222*b* so that engine 21 and gear transmission chamber C2 are juxtaposed in a direction perpendicular to the fore-and-aft direction of engine-transmission assembly 220, e.g., upper and lower or right and left. Horizontal engine output shaft 26 of engine 21 projects forward into belt transmission chamber C1 via the vertical face of middle housing 222*b* so as to serve as a drive pulley shaft 26 having a drive pulley 227 thereon. A driven pulley shaft 230 is journalled by the partition wall of middle housing 222*b* via a bearing. Driven pulley shaft 230 is extended forward from the partition wall into belt transmission chamber C1 so as to have a driven pulley 229 thereon. A belt 228 is looped over pulleys 227 and 229 in belt transmission chamber 228. Whereby engine-transmission assembly 220 includes belt transmission BT4 having belt transmission chamber C1 incorporating belt 228 and pulleys 227 and 229.

Drive pulley 230 extends rearward from the partition wall of middle housing 222*b* into gear transmission chamber C2 so as to serve as an input shaft 230 of a gear transmission configured in gear transmission chamber C2. This gear transmission includes shafts 230, 234, 236, 242 and 245 and gears on these shafts. The partition wall in middle housing 222*b* journals the intermediate portion of input shaft 230 via the bearing as mentioned above. Further, the partition wall in middle housing 222*b* supports a front end of shaft 234, journals front ends of shafts 236 and 242 via respective bearings and journals an intermediate portion of shaft 245 via a bearing. A partition wall is formed in rear housing 222*c* to define a rear end of gear transmission chamber C2. The partition wall in rear housing 222*c* supports a rear end of shaft 234, journals rear ends of shafts 230 and 242 via respective bearings and journals intermediate portions of shafts 236 and 245 via respective bearings.

A high speed drive gear 231, a low speed drive gear 232 and a reverse drive gear 233 are fixed or formed on input shaft 230 so as to be rotatably integral with shaft 230. A high speed driven gear 237 is fitted at a central boss thereof on first counter shaft 236 so as to be rotatable relative to first counter shaft 236. Gears 231 and 237 directly mesh with each other so as to constitute a high speed gear train HG2. The central boss of high speed driven gear 237 is axially extended along first counter shaft 236 so as to have a low speed driven gear 238 fitted thereon so that low speed driven gear 238 is rotatable relative to high speed driven gear 237. Gears 232 and 238 directly mesh with each other so as to constitute a low speed gear train LG2. A reverse driven gear 239 is fitted on first counter shaft 236 so as to be rotatable relative to counter shaft 236. An idling gear 235 is fitted on idling gear shaft 234 and directly meshes with gears 233 and 239. Gears 233, 235 and 239 constitute a reverse gear train RG4.

A shifter 240 is spline-fitted on first counter shaft 236 between the central boss of high speed driven gear 237 and a central boss of reverse driven gear 239 so as to be not rotatable relative to shaft 236 and so as to be axially slidable along shaft 236. A fork 241 is fitted on shifter 240. FIG. 17 shows a low speed forward traveling position L, a high speed forward traveling position H, a neutral position N and a backward traveling position R as positions of fork 241. When fork 241 is disposed at low speed forward traveling position L, shifter 240 meshes with low speed driven gear 238 so as to drivingly connect first counter shaft 236 to input shaft 230 via low speed gear train LG2. When fork 241 is disposed at high speed forward traveling position H, shifter 240 meshes with the central boss of high speed driven gear 237 so as to drivingly connect first counter shaft 236 to input shaft 230 via high speed gear train HG2. When fork 241 is disposed at neutral position N, shifter 240 meshes with none of gears 237, 238 and 239 so as to isolate first counter shaft 236 from a rotary force of input shaft 230. When fork 241 is disposed at backward traveling position R, shifter 240 meshes with the central boss of reverse driven gear 239 so as to drivingly connect first counter shaft 236 to input shaft 230 via reverse gear train RG4.

Counter gears 243 and 244 are fixed on second counter shaft 242. Counter gear 243 directly meshes with a gear 239 fixed on first counter shaft 236. Counter gear 244 directly meshes with a gear 246 fixed on output shaft 245. Whereby gears 239, 243, 244 and 246 transmit power from first counter shaft 236 to output shaft 245 via second counter shaft 242. Output shaft 245 extends forward from the partition wall in middle housing 222b into belt transmission chamber C1. Output shaft 245 is extended through a space in belt transmission chamber C1 between a portion of belt 228 running from pulley 227 to pulley 229 and a portion of belt 228 running from pulley 229 to pulley 227. A front end portion of output shaft 245 projects forwardly outward from a front surface of front housing 222a so as to be drivingly connected to front transaxle FT (see FIG. 18). A rear end portion of output shaft 245 projects rearwardly outward from a rear portion of rear housing 222c defining the partition wall in rear housing 222c so as to be drivingly connected to rear transaxle RT (see FIG. 18).

The rear portion of rear housing 222c is partly expanded rearward so as to be formed as a flange to which a front end of a motor generator casing 223 is fastened via a spacer 223a. The flange of rear housing 222c and spacer 223a fixed to the flange of rear housing 222c defines a shaft connection chamber C3 therein. A rear end portion of first counter shaft 236 projects rearward from the partition wall in rear housing 222c into shaft connection chamber C3. Motor generator casing 223 and spacer 223a journal a rotor shaft 248 via respective bearings. A front end portion of rotor shaft 248 projects forward from motor generator casing 223 into shaft connection chamber C3 via spacer 223a coaxially to first counter shaft 236. In shaft connection chamber C3, a coupling sleeve 247 is spline-fitted on the rear end portion of first counter shaft 236 and the front end portion of rotor shaft 248 so as to drivingly integrate rotor shaft 248 with first counter shaft 236.

Motor generator casing 223 and spacer 223a define a motor generator chamber C4 therein. In motor generator chamber C4, a stator 250 with armature windings is fixed to an inner peripheral surface of motor generator casing 223 so as to surround a magnet rotor 249 fixed on rotor shaft 248. Whereby an electric motor generator 251 including rotor 249 and stator 250 is configured in motor generator casing 223.

On an assumption that engine 21 is driven and fork 241 is set at any position other than neutral position N, rotor shaft 248 follows rotation of first counter shaft 236 so that motor generator 251 functions as a generator when motor generator 251 is not supplied with electric power from a battery. Motor generator 251 functioning as the generator also functions as a regeneration brake serving as an engine brake of a vehicle having a multi-speed transmission.

On the same assumption, motor generator 251 functions as an electric motor for assisting engine 21 to drive output shaft 245 when motor generator 251 is supplied with electric power from the battery. If engine 21 is not driven or fork 241 is set at neutral position N, motor generator 251 when it is supplied with electric power functions as the electric motor to drive output shaft 245 without power of engine 21. Motor generator 251 functioning as the electric motor serves as a continuously variable transmission for steplessly changing the speed of output shaft 245.

Motor generator casing 223 incorporating motor generator 251 including rotor shaft 248 can be easily handled so as to be optionally attached to a predetermined portion of transmission casing 222, thereby enabling to select whether or not engine-transmission assembly 220 is provided with motor generator 251. Alternatively, a design of engine-transmission assembly 220 may be changed so as to have rotor shaft 248 of motor generator 251 connected to any shaft in gear transmission chamber C2, e.g., input shaft 230 or second counter shaft 242, other than first counter shaft 236.

Figure 18:
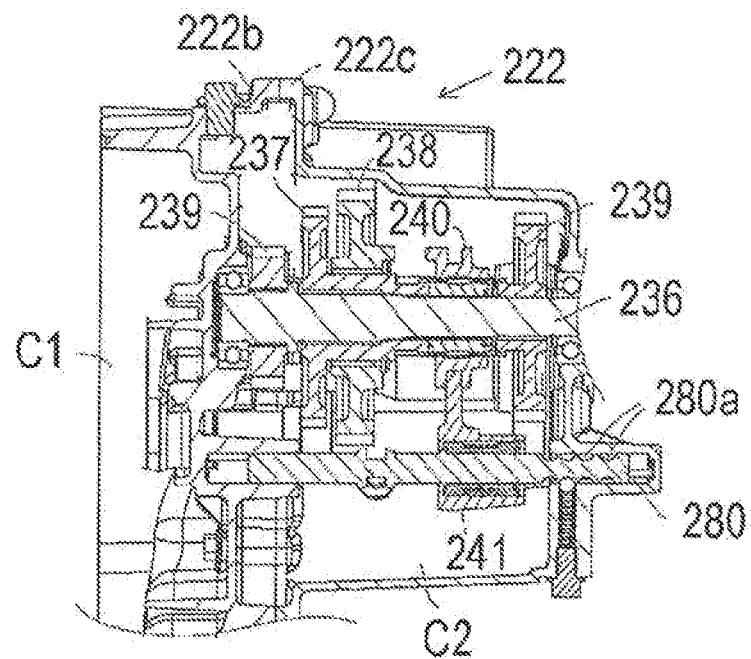
FIG. 18 is a fragmentary sectional view of central engine-transmission assembly 220 showing a transmission (first counter) shaft 236 and a fork shaft 280 operatively connected to each other via a fork 241.

Referring to FIGS. 18, 19 and 20, an arrangement of shifters 281 and 282 for detecting a position of shifter 240 (more specifically, fork 241) is shown. In transmission casing 222, a fork shaft 280 having fork 241 fitted thereon is extended parallel to first counter shaft 236, as shown in FIGS. 18 and 19. Fork shaft 280 is axially slidable and is formed on an axial end portion thereof with detent grooves 280a corresponding to the low-speed forward traveling position, high-speed forward traveling position, neutral position and backward traveling position of fork 241.

Sensors 281 and 282 are fitted into transmission casing 222 (more specifically, rear housing 222c) as shown in FIGS. 19 and 20. Annular projections 241a and 241b are formed on an outer peripheral surface of a cylindrical portion of fork 241 fitted on fork shaft 280. Sensor 281 responds to projection 241a when fork 241 reaches the neutral position, thereby detecting a real arrival of shifter 240 at the neutral position. Sensor 282 responds to projection 241b when fork 241 reaches the backward traveling position, thereby detecting a real arrival of shifter 240 at the backward traveling position. Alternatively, another sensor for detecting fork 241 arriving at the high speed forward traveling position or the low speed forward traveling position.

The movement of shifter 240 directly responds to the axial movement of fork 241 and fork shaft 280. On the other hand, the axial movement of fork shaft 280 depends on an operation of a solenoid valve according to detection of a position of a gearshift manipulator in vehicle V5. Accordingly, there is a time lag between the position of the gearshift manipulator recognized by an operator and the actual position of shifter 240. It is difficult for the operator to recognize this time lag. Therefore, when sensor 281 or 282 detects the position of fork 241 corresponding to the actual position of shifter 240, the actual arrival of shifter 240 at the backward traveling position or the neutral position is indicated on an indicator in vehicle V5, thereby preventing such a wrong condition that, although the gearshift manipulator has been shifted to the neutral position, the vehicle does not desirably reduce its traveling speed or stop because shifter 240 does not reach the neutral position, or such a wrong condition that, although the gearshift manipulator has been shifted to the backward traveling position, the vehicle does not desirably start traveling backward because shifter 240 does not reach the backward traveling position.

It is further understood by those skilled in the art that the foregoing description is a preferred embodiment of the disclosed apparatus and that various changes and modifications may be made in the invention without departing from the scope thereof defined by the following claims.

What is claimed is:

1. A hybrid utility vehicle comprising:
   a pair of front wheels;
   a front differential gear unit for differentially connecting the front wheels;
   a pair of rear wheels;
   a rear differential gear unit for differentially connecting the rear wheels;
   an internal combustion engine configured as a power source of at least the rear wheels;
   an electric motor configured as a power source of at least the front wheels;
   a battery operatively connected to the electric motor;
   a body frame comprising a front side support portion for supporting the front wheels, a rear side support portion for supporting the rear wheels, and an arrangement portion comprising a driver's seat disposed between the front side support portion and the rear side support portion;
   a loading bed disposed rearwards of the arrangement portion; and
   a boarding floor positioned in front of the arrangement portion of the driver's seat on the body frame;
   wherein the internal combustion engine and the electric motor are disposed apart from each other in the front-rear direction,
   wherein the internal combustion engine and the electric motor are disposed rearward of the boarding floor and are disposed under the loading bed, and
   wherein the internal combustion engine is disposed forward of the rear wheels.

2. The hybrid utility vehicle according to claim 1, wherein the front wheels and the rear wheels are configured to be driven by switching between a state in which the internal combustion engine is used as a common power source and a state in which the electric motor is used as a common power source.

3. A hybrid utility vehicle comprising:
   a pair of front wheels;
   a front differential gear unit for differentially connecting the front wheels;
   a pair of rear wheels;
   a rear differential gear unit for differentially connecting the rear wheels;
   an internal combustion engine configured as a common power source for the front wheels and the rear wheels;
   an electric motor configured as a common power source for the front wheels and the rear wheels;
   a battery operatively connected to the electric motor;
   a body frame comprising a front side support portion for supporting the front wheels, a rear side support portion for supporting the rear wheels, an arrangement portion comprising a driver's seat disposed between the front side support portion and the rear side support portion;
   a loading bed disposed rearwards of the arrangement portion; and
   a boarding floor positioned in front of the arrangement portion of the driver's seat on the body frame;
   wherein the internal combustion engine and the electric motor are disposed apart from each other in the front-rear direction,
   wherein the internal combustion engine and the electric motor are disposed rearward of the boarding floor and are disposed under the loading bed, and
   wherein the internal combustion engine is disposed forward of the rear wheels.

4. The hybrid utility vehicle according to claim 3, wherein the internal combustion engine and the electric motor are configured such that when the front wheels and the rear wheels are driven by the internal combustion engine, the electric motor is driven by the internal combustion engine, and such that when the front wheels and the rear wheels are driven by the electric motor, a transmission of power between the electric motor and the internal combustion engine is disconnected.

* * * * *